United States Patent
Grigoryan et al.

(10) Patent No.: US 10,394,612 B2
(45) Date of Patent: Aug. 27, 2019

(54) METHODS AND SYSTEMS TO EVALUATE DATA CENTER PERFORMANCE AND PRIORITIZE DATA CENTER OBJECTS AND ANOMALIES FOR REMEDIAL ACTIONS

(71) Applicant: VMware, Inc., Palo Alto, CA (US)

(72) Inventors: Naira Movses Grigoryan, Yerevan (AM); Vahan Tadevosyan, Yerevan (AM); Nina Karapetyan, Yerevan (AM); Ashot Nshan Harutyunyan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 411 days.

(21) Appl. No.: 15/190,678

(22) Filed: Jun. 23, 2016

(65) Prior Publication Data
US 2017/0371878 A1 Dec. 28, 2017

(51) Int. Cl.
*G06F 9/50* (2006.01)
(52) U.S. Cl.
CPC ................... *G06F 9/5072* (2013.01)
(58) Field of Classification Search
CPC ......... G06F 2009/4557; G06F 11/3452; G06F 9/5017; G06F 1/14; G06F 11/3055; G06F 11/30; G06F 3/0653; G06F 11/0793; G06N 7/005; G06Q 10/0639; G07C 5/0808; G04F 5/00
See application file for complete search history.

(56) References Cited

U.S. PATENT DOCUMENTS

| | | | |
|---|---|---|---|
| 2004/0143417 A1* | 7/2004 | Hedlund | B60L 3/12 702/183 |
| 2006/0168170 A1* | 7/2006 | Korzeniowski | H04L 41/0604 709/223 |
| 2012/0159259 A1* | 6/2012 | Klein | G06F 11/0757 714/38.1 |
| 2014/0331277 A1* | 11/2014 | Frascadore | H04L 63/20 726/1 |
| 2015/0039555 A1* | 2/2015 | Rao | G06F 17/30377 707/607 |
| 2015/0326601 A1* | 11/2015 | Grondin | G06Q 10/0635 726/25 |
| 2017/0124631 A1* | 5/2017 | Bhandari | G06N 7/005 |
| 2018/0032636 A1* | 2/2018 | Mullaney | H04L 51/32 |

* cited by examiner

*Primary Examiner* — Yuk Ting Choi

(57) ABSTRACT

Methods and systems to evaluate data center performance and prioritize data center objects and anomalies for remedial actions are described. Methods rank data center objects and determine object performance trends. Methods calculate an object rank of each object of the data center over a period of time and calculate an object trend of each object of the data center based on relative frequencies of alerts at different times. The objects may be prioritized for remedial actions based on the object ranks and object trends.

18 Claims, 23 Drawing Sheets

| Objects | informal | warning | immediate | critical |
|---|---|---|---|---|
| $O_1$ | 3 | 1 | 0 | 0 |
| $O_2$ | 5 | 4 | 3 | 1 |
| $O_3$ | 4 | 2 | 0 | 0 |
| $O_4$ | 6 | 5 | 5 | 0 |
| $O_5$ | 7 | 3 | 1 | 1 |
| $O_6$ | 5 | 4 | 3 | 2 | ially add
METHODS AND SYSTEMS TO EVALUATE DATA CENTER PERFORMANCE AND PRIORITIZE DATA CENTER OBJECTS AND ANOMALIES FOR REMEDIAL ACTIONS

TECHNICAL FIELD

The present disclosure is directed to ranking data center objects and alerts.

BACKGROUND

Cloud-computing facilities provide computational bandwidth and data-storage services much as utility companies provide electrical power and water to consumers. Cloud computing provides enormous advantages to customers without the devices to purchase, manage, and maintain in-house data centers. Such customers can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, customers can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a customer.

A typical data center comprises numerous physical and virtual data center objects, such as server computers, virtual machines, virtual data centers switches, routers, and mass data-storage devices interconnected by local-area networks, wide-area networks, and wireless communications. Because of the large numbers of data center objects, information technology ("IT") administrators rely on data center management tools to collect object indicators. Typical data center management tools calculate current status reports of the data center objects based on the indicators. However, many of these management tools do not provide long-term characterization of the objects. In particular, typical management tools do not project problems with data center objects, cannot determine stability of data center objects over time, and cannot identify which objects experience a degradation in performance over time. Management tools also do not provide a historic summary of data center objects that can be used to determine whether or not object performance problems have been resolved.

SUMMARY

Methods and systems to evaluate data center performance, and prioritize data center objects and anomalies for remedial actions are described. Methods rank data center objects and determine object performance trends, which are used to prioritize objects for remedial action. Methods calculate an object rank of each object of the data center over a period of time. The object rank is calculated as a weighted function of relative frequencies of alerts that occur within the period of time. Methods also calculate an object trend of each object of the data center. The object trend is calculated as a weighted function of the difference between a first relative frequency at a first time stamp and second relative frequency at a second time stamp. The objects may be prioritized for remedial actions based on the object ranks and object trends. Methods also calculate super indicators that may be used to determine a long-term characterization of the performance of a data center.

DETAILED DESCRIPTION

This disclosure presents computational methods and systems to evaluate data center performance and prioritize data center objects and anomalies in order to prioritize poorly performing objects for remedial action. In a first subsection, computer hardware, complex computational systems, and virtualization are described. Methods and systems to evaluate data center performance and prioritize data center objects and anomalies for remedial action are described in a second subsection.

Computer Hardware, Complex Computational Systems, and Virtualization

Figure 1:
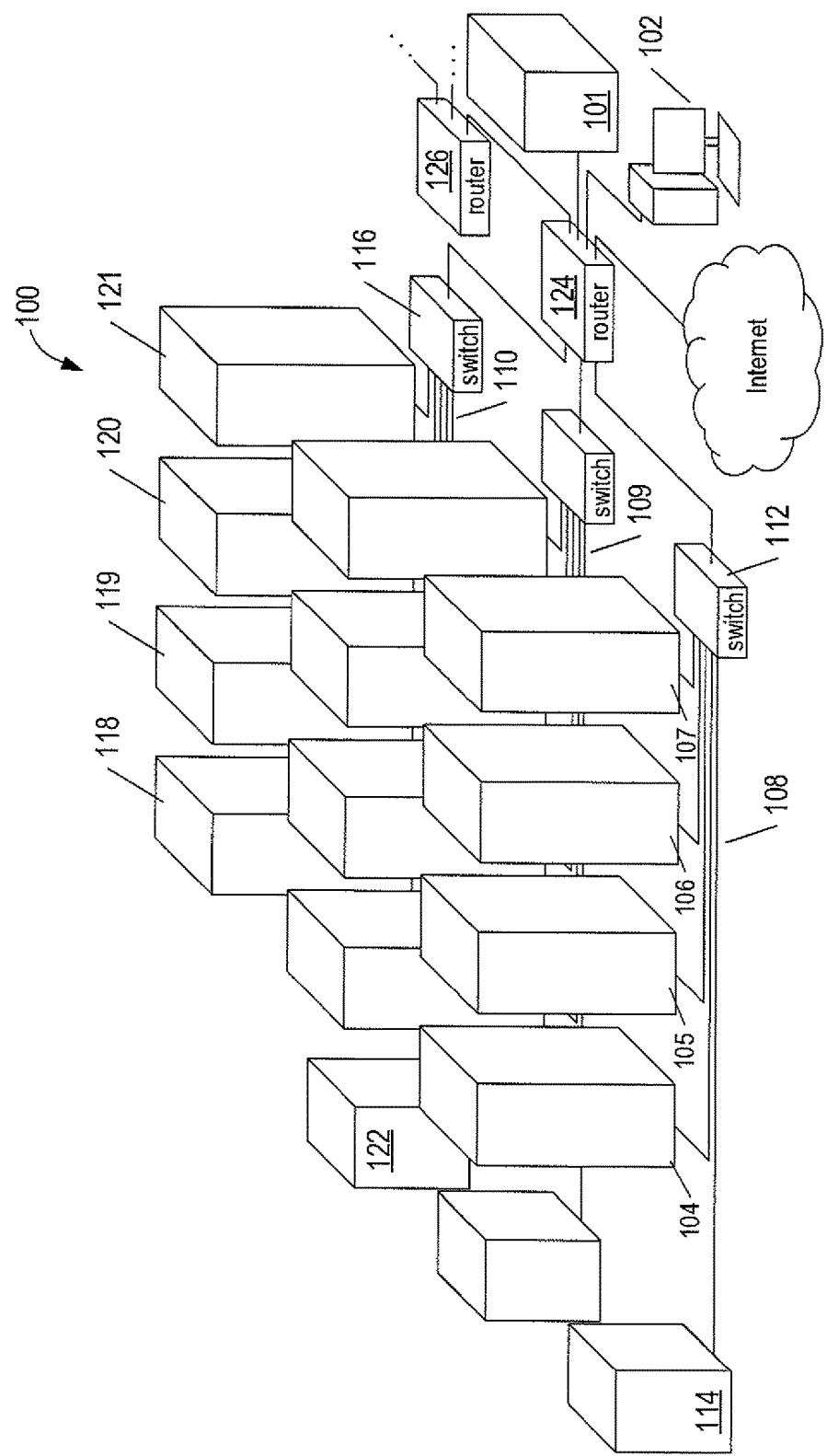
FIG. 1 shows an example of a cloud-computing facility.

FIG. 1 shows an example of a data center 100. The data center 100 consists of a virtual-data-center management server 101 and a PC 102 on which a virtual-data-center management interface may be displayed to system administrators and other users. The data center 100 additionally includes a number of hosts or server computers, such as server computers 104-107, that are interconnected to form three local area networks 108-110. For example, local area network 108 includes a switch 112 that interconnects the four servers 104-107 and a mass-storage array 114 via Ethernet or optical cables and local area network 110 includes a switch 116 that interconnects four servers 118-1121 and a mass-storage array 122 via Ethernet or optical cables. In this example, the data center 100 also includes a router 124 that interconnects the LANs 108-110 and interconnects the LANS to the Internet, the virtual-data-center management server 101, the PC 102 and to a router 126 that, in turn, interconnects other LANs composed of server computers and mass-storage arrays (not shown). In other words, the routers 124 and 126 are interconnected to form a larger network of server computers.

Figure 2:
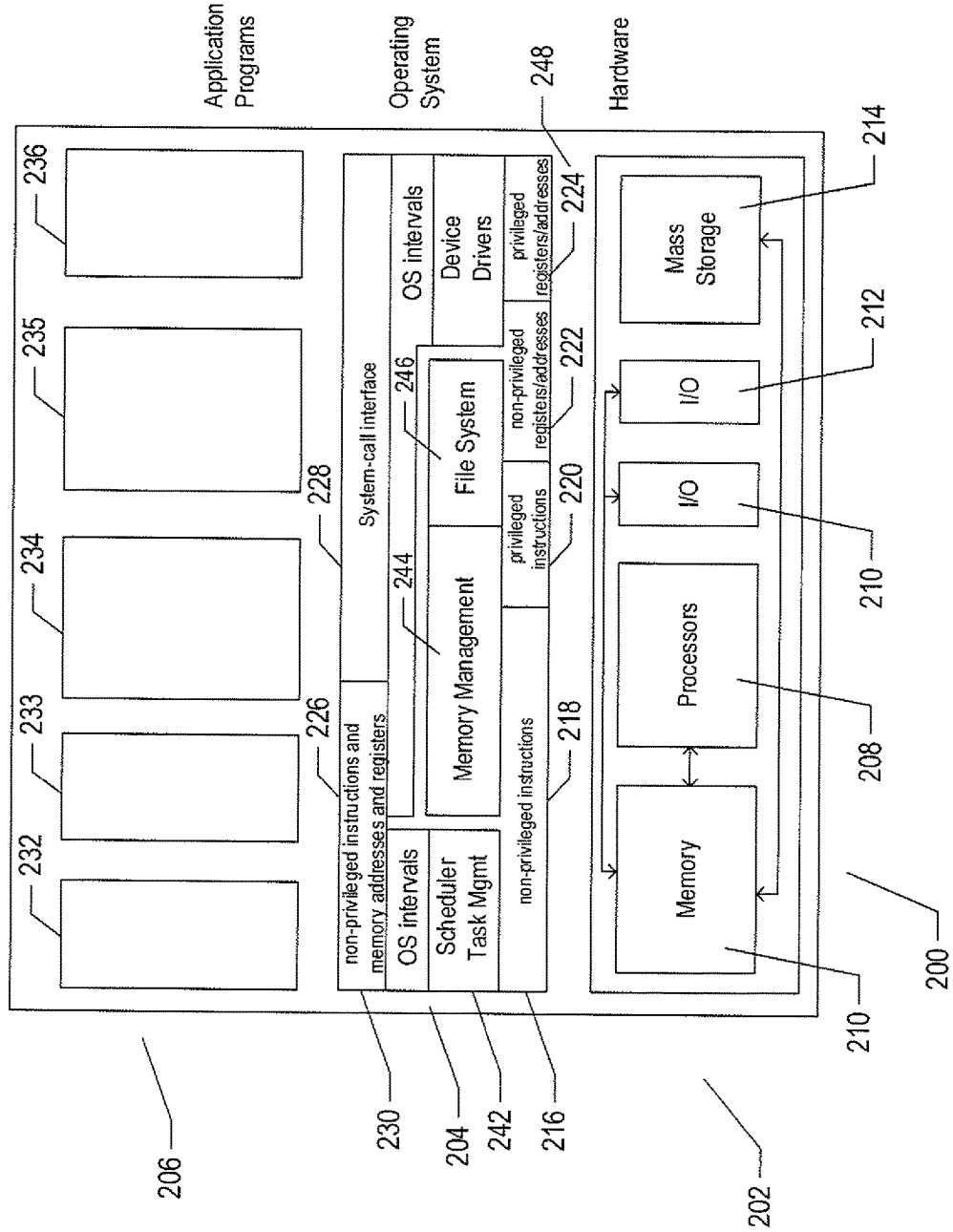
FIG. 2 shows generalized hardware and software components of a server computer.

FIG. 2 shows generalized hardware and software components of a server computer. The server computer 200 includes three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules.

To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3A:
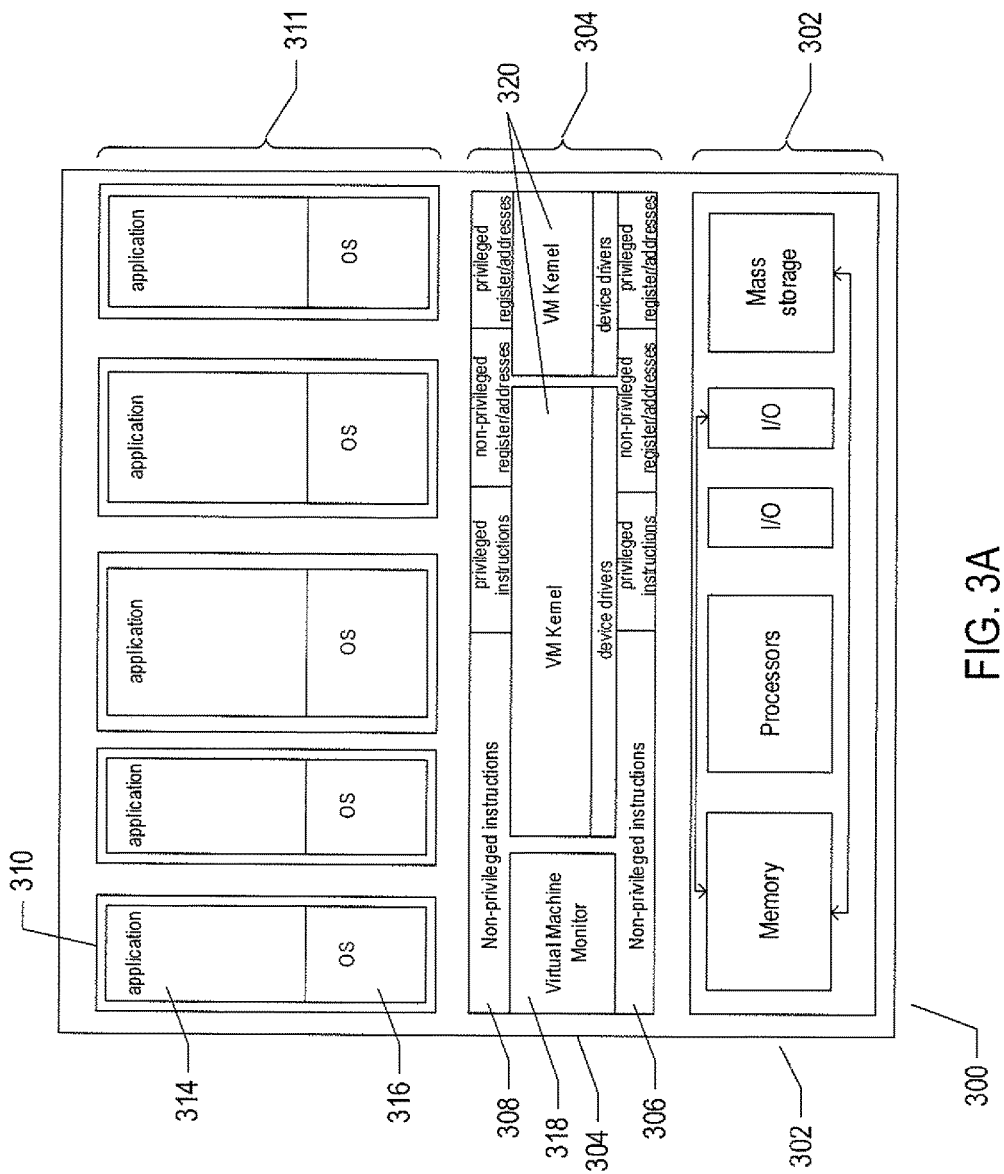
FIGS. 3A-3B show two types of virtual machines and virtual-machine execution environments.
Figure 3B:
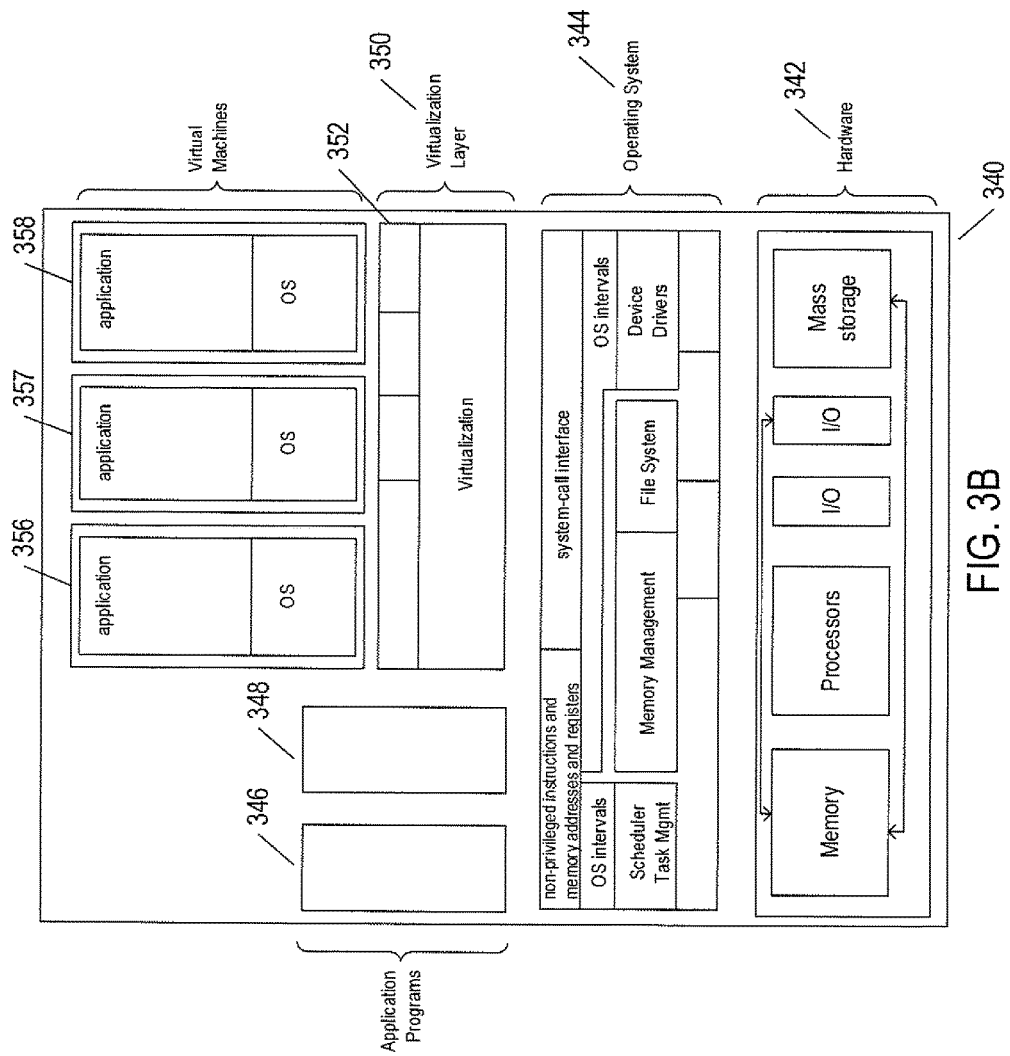

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 3A-3B show two types of VM and virtual-machine execution environments. FIGS. 3A-3B use the same illustration conventions as used in FIG. 2. FIG. 3A shows a first type of virtualization. The server computer 300 in FIG. 3A includes the same hardware layer 302 as the hardware layer 202 shown in FIG. 2. However, rather than providing an operating system layer directly above the hardware layer, as in FIG. 2, the virtualized computing environment shown in FIG. 3A features a virtualization layer 304 that interfaces through a virtualization-layer/hardware-layer interface 306, equivalent to interface 216 in FIG. 2, to the hardware. The virtualization layer 304 provides a hardware-like interface 308 to a number of VMs, such as VM 310, in a virtual-machine layer 311 executing above the virtualization layer 304. Each VM includes one or more application programs or other higher-level computational entities packaged together with an operating system, referred to as a "guest operating system," such as application 314 and guest operating system 316 packaged together within VM 310. Each VM is thus equivalent to the operating-system layer 204 and application-program layer 206 in the general-purpose computer system shown in FIG. 2. Each guest operating system within a VM interfaces to the virtualization-layer interface 308 rather than to the actual hardware interface 306. The virtualization layer 304 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 304 ensures that each of the VMs currently executing within the virtual environment receive a fair allocation of underlying hardware devices and that all VMs receive sufficient devices to progress in execution. The virtualization-layer interface 308 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 304 includes a virtual-machine-monitor module 318 that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 308, the accesses result in execution of virtualization-layer code to simulate or emulate the privileged devices. The virtualization layer additionally includes a kernel module 320 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 304 essentially schedules execution of VMs much like an operating system schedules execution of application programs, so that the VMs each execute within a complete and fully functional virtual hardware layer.

FIG. 3B shows a second type of virtualization. In FIG. 3B, the server computer 340 includes the same hardware layer 342 and operating system layer 344 as the hardware layer 202 and the operating system layer 204 shown in FIG. 2. Several application programs 346 and 348 are shown running in the execution environment provided by the operating system 344. In addition, a virtualization layer 350 is also provided, in computer 340, but, unlike the virtualization layer 304 discussed with reference to FIG. 3A, virtualization layer 350 is layered above the operating system 344, referred to as the "host OS," and uses the operating system interface to access operating-system-provided functionality as well as the hardware. The virtualization layer 350 comprises primarily a VMM and a hardware-like interface 352, similar to hardware-like interface 308 in FIG. 3A. The virtualization-layer/hardware-layer interface 352, equivalent to interface 216 in FIG. 2, provides an execution environment for a number of VMs 356-358, each including one or more application programs or other higher-level computational entities packaged together with a guest operating system.

In FIGS. 3A-3B, the layers are somewhat simplified for clarity of illustration. For example, portions of the virtualization layer 350 may reside within the host-operating-system kernel, such as a specialized driver incorporated into the host operating system to facilitate hardware access by the virtualization layer.

Figure 4:
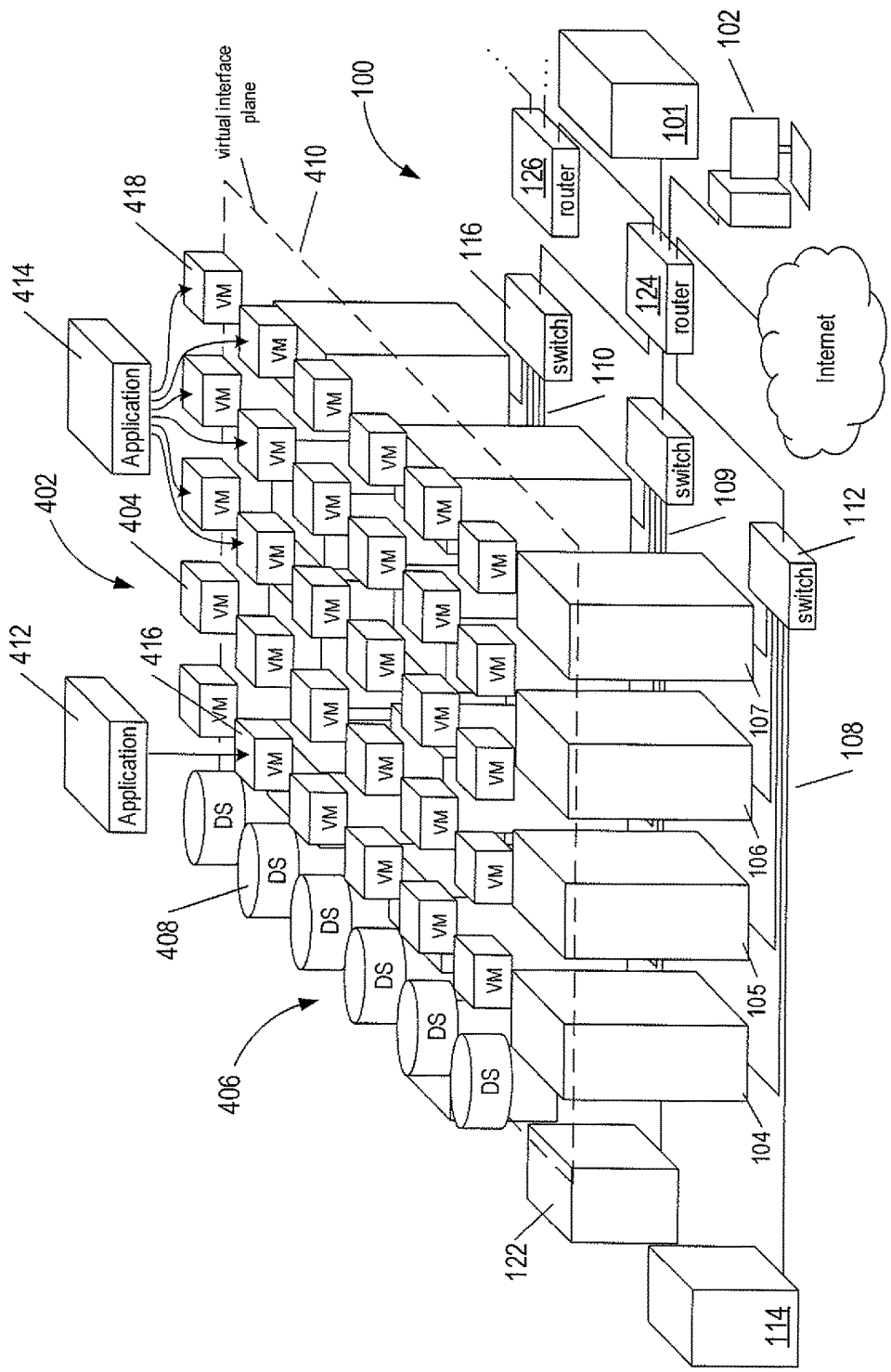
FIG. 4 shows an example set of virtual machines and datastores above a virtual interface plane of a physical data center.

FIG. 4 shows an example set of VMs 402, such as VM 404, and a set of virtual datastores ("DS") 406, such as DS 408, above a virtual interface plane 410 which in turn is located above the physical data center 100. The virtual interface plane 410 represents a separation between a physical resource level that comprises the server computers and mass-data storage arrays and a virtual resource level that comprises the VMs and DSs. The set of VMs 402 may be partitioned to run on different server computers, and the set of DSs 406 may be partitioned on different mass-storage arrays. Because the VMs are not bound physical devices, the VMs may be moved to different server computers in an attempt to maximize efficient use of the data center 100 resources. For example, each of the server computers 104-107 may initially run three VMs. However, because the VMs have different workloads and storage requirements, the VMs may be moved to other server computers with available data storage and computational resources. FIG. 4 shows two application programs 412 and 414. Application program 412 runs on a single VM 416. On the other hand, application program 414 is a distributed application that runs on six VMs, such as VM 418.

Certain VMs may also be grouped into resource pools. For example, suppose a host is used to run five VMs and a first department of an organization uses three of the VMs and a second department of the same organization uses two of the VMs. Because the second department needs larger amounts of CPU and memory, a systems administrator may create one resource pool that comprises the three VMs used by the first department and a second resource pool that comprises the two VMs used by the second department. The second resource pool may be allocated more CPU and memory to meet the larger demands.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

The virtual-data-center management interface allows provisioning and launching of VMs with respect to resource pools, virtual datastores, and virtual networks, so that virtual-data-center administrators need not be concerned with the identities of physical-data-center components used to execute particular VMs. Furthermore, a virtual-data-center management server includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 5:
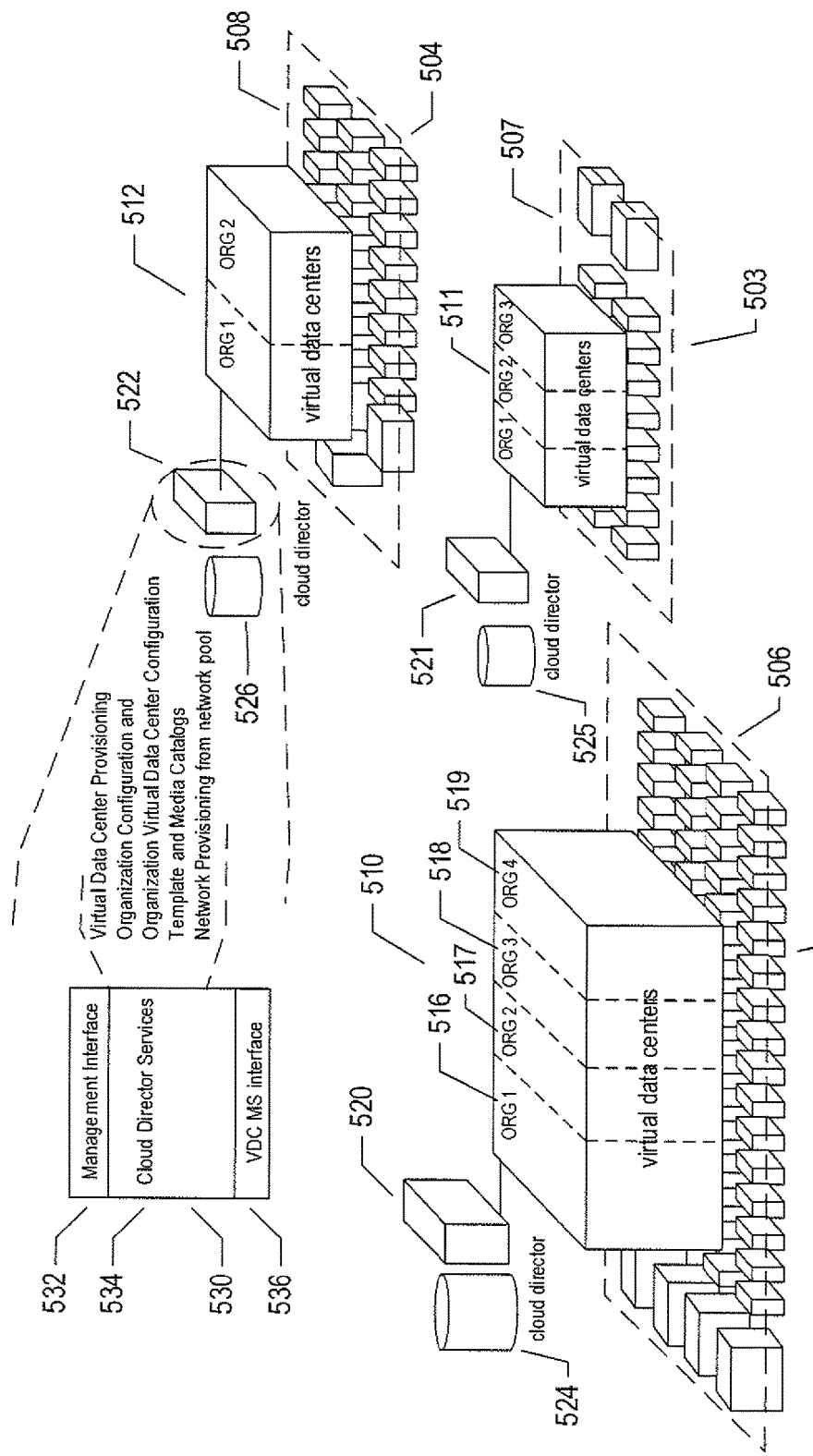
FIG. 5 shows a cloud-director level of abstraction.

FIG. 5 shows a cloud-director level of abstraction. In FIG. 5, three different physical data centers 502-504 are shown below planes representing the cloud-director layer of abstraction 506-508. Above the planes representing the cloud-director level of abstraction, multi-tenant virtual data centers 510-512 are shown. The devices of these multi-tenant virtual data centers are securely partitioned in order to provide secure virtual data centers to multiple tenants, or cloud-services-accessing organizations. For example, a cloud-services-provider virtual data center 510 is partitioned into four different tenant-associated virtual-data centers within a multi-tenant virtual data center for four different tenants 516-519. Each multi-tenant virtual data center is managed by a cloud director comprising one or more cloud-director servers 520-522 and associated cloud-director databases 524-526. Each cloud-director server or servers runs a cloud-director virtual appliance 530 that includes a cloud-director management interface 532, a set of cloud-director services 534, and a virtual-data-center management-server interface 536. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications.

Figure 6:
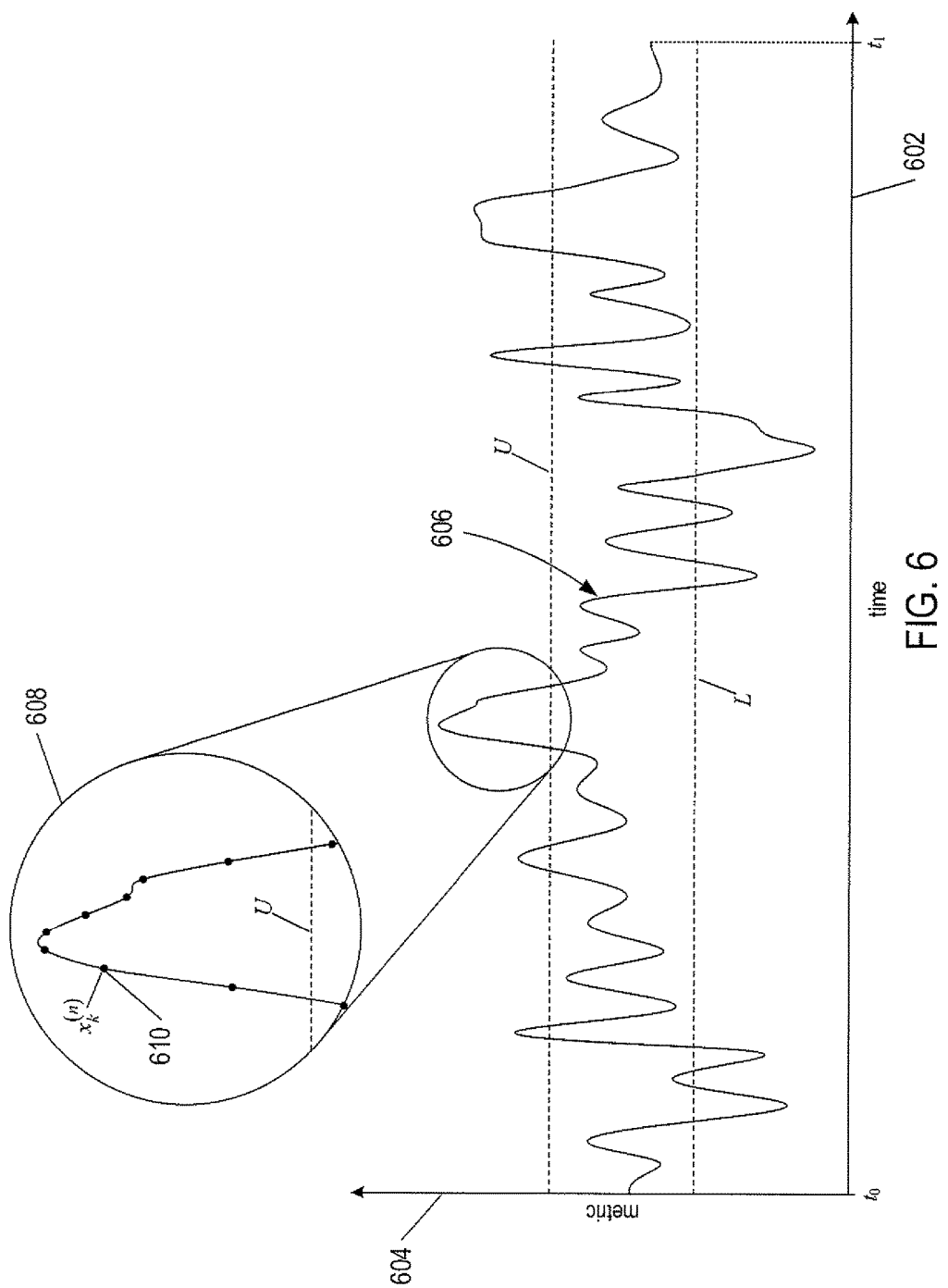
FIG. 6 shows a plot of a set of metric data.

Methods to Evaluate Data Center Performance and Prioritize Data Center Objects and Anomalies for Remedial Action In the following description, a physical or virtual component of a physical data center is called an object. For example, an object may be a computer server, a data storage device, or any component of a computer server. An object may also be a VM, a VDC, and virtual component of VM or VDC. A full set of objects of a physical data center are denoted by $$\{O_m\}_{m=1}^M \qquad (1)$$

where
$O_m$ is the m-th object; and
M is the number of data center objects.
Each object has one or more associated metrics that are used to monitor usage of the object or may be used as a performance indicator of the object. The set of metrics for the M data center objects $O_1, \ldots, O_M$ are denoted by $$\{x^{(n)}(t)\}_{n=1}^N \qquad (2)$$

where
$x^{(n)}(t)$ denotes the n-th set of metric data associated with one data center object; and
N represents the number of metrics.
Each set of metric data is time-series data represented by $$x^{(n)}(t) = \{x^{(n)}(t_k)\}_{k=1}^K = \{x_k^{(n)}\}_{k=1}^K \qquad (3)$$

where
$x_k^{(n)} = x^{(n)}(t_k)$ represents a metric value at the k-th time stamp $t_k$; and
K is the number of time stamps in the set of metric data.
FIG. 6 shows a plot of a set of metric data. Horizontal axis 602 represents time. Vertical axis 604 represents a range of metric values. Curve 606 represents a set of metric data associated with an object generated over a period of time [$t_0$, $t_1$]. For example, the object may be server computer and the metric may be memory capacity, CPU usage, or disk I/O of the server computer over the period of time [$t_0$, $t_1$]. FIG. 6 includes a magnified view 608 of metric values. Each dot, such as solid dot 610, represents a metric value $x_k^{(n)}$ at generated at a time stamp $t_k$. Each metric value represents a usage level or is a performance indicator of the object at a time stamp. Horizontal dashed line "U" represents an upper threshold, and horizontal dashed line "L" represents a lower threshold. When the metric data violates either the upper threshold U (i.e., $x_k^{(n)} > U$), or the lower threshold L (i.e., $x_k^{(n)} < L$), an alert is generated indicating that a problem with the associated object has occurred. For example, in magnified view 608, a metric value 610 is greater than the upper threshold, which triggers an alert.

Each object may have a number of different upper and lower threshold alert definitions that indicate the severity of a threshold violation so that appropriate remedial action may be taken to resolve the problem. Alerts can also be defined as logical (e.g., Boolean AND/OR) combinations of threshold violation conditions on different metrics of an object as composite anomaly constructs with various alert levels attributed to the logical definition. In a particular case, a series of upper thresholds with a number of different alert levels may be represented as follows:

$$u_{low} < \ldots < u_i < \ldots < u_{high} \qquad (4)$$

where
$u_{low}$ is a lowest upper threshold;
$u_i$ is an intermediate upper threshold; and
$u_{high}$ is a highest upper threshold.

Each increasing upper threshold represents an incremental increase in an alert level of a problem with the object. When a metric value violates one of the upper thresholds, an appropriate alert is generated indicating the alert level of the problem. For example, when a metric value violates the lowest upper threshold $u_{low}$ (i.e., $x_k^{(n)} > u_{low}$) an alert is generated indicating that a problem has occurred with the object but the problem may not be detrimental to performance of the object. With each increasing upper threshold violation the alert level increases. When a metric value violates the highest upper threshold $u_{high}$ (i.e., $x_k^{(n)} > u_{high}$), an alert is generated indicating that the alert level is critical.

A series of lower thresholds with a number of different alert levels may be represented as follows:

$$l_{high} > \ldots > l_i > \ldots > l_{low} \qquad (5)$$

where
$l_{high}$ is a highest lower threshold;
$l_i$ is an intermediate lower threshold; and
$l_{low}$ is a lowest lower threshold.

Each decreasing lower threshold represents an incremental increase in the alert level of a problem with the object. When a metric value violates one of the lower thresholds, an appropriate alert is also generated. For example, when a metric value violates the highest lower threshold $l_{high}$ (i.e., $x_k^{(n)} < l_{high}$) an alert is generated indicating that a problem has occurred but the problem may not be detrimental to performance of the object. With each decreasing lower threshold violation the alert level increases. When a metric value violates the lowest lower threshold $l_{low}$ (i.e., $x_k^{(n)} < l_{low}$), an alert is generated indicating that the alert level is critical.

Note that although various implementations of methods are described below for objects evaluated with both upper and lower thresholds, it may be the case that the usage and performance of certain objects may be evaluated with either upper thresholds or lower thresholds. For example, the usage and performance of one type of object may be evaluated with only upper thresholds, while the usage and performance of another type of object may be evaluated with only lower thresholds. While the usage and performance of types of objects may be evaluated with both upper and lower thresholds.

In practice, the number of upper and/or lower thresholds used to evaluate the usage and/or performance of objects may range from as few as two thresholds to any suitable number of thresholds. For the sake of simplicity in the following description, examples of alert definitions are describes for four upper thresholds and four lower thresholds. Upper thresholds with four different alert levels may be represented by:

$$u_{in} < u_w < u_{im} < u_c \qquad (6)$$

Lower thresholds with four different alert levels may be represented by:

$$l_c < l_{im} < l_w < l_{in} \qquad (7)$$

Figure 7:
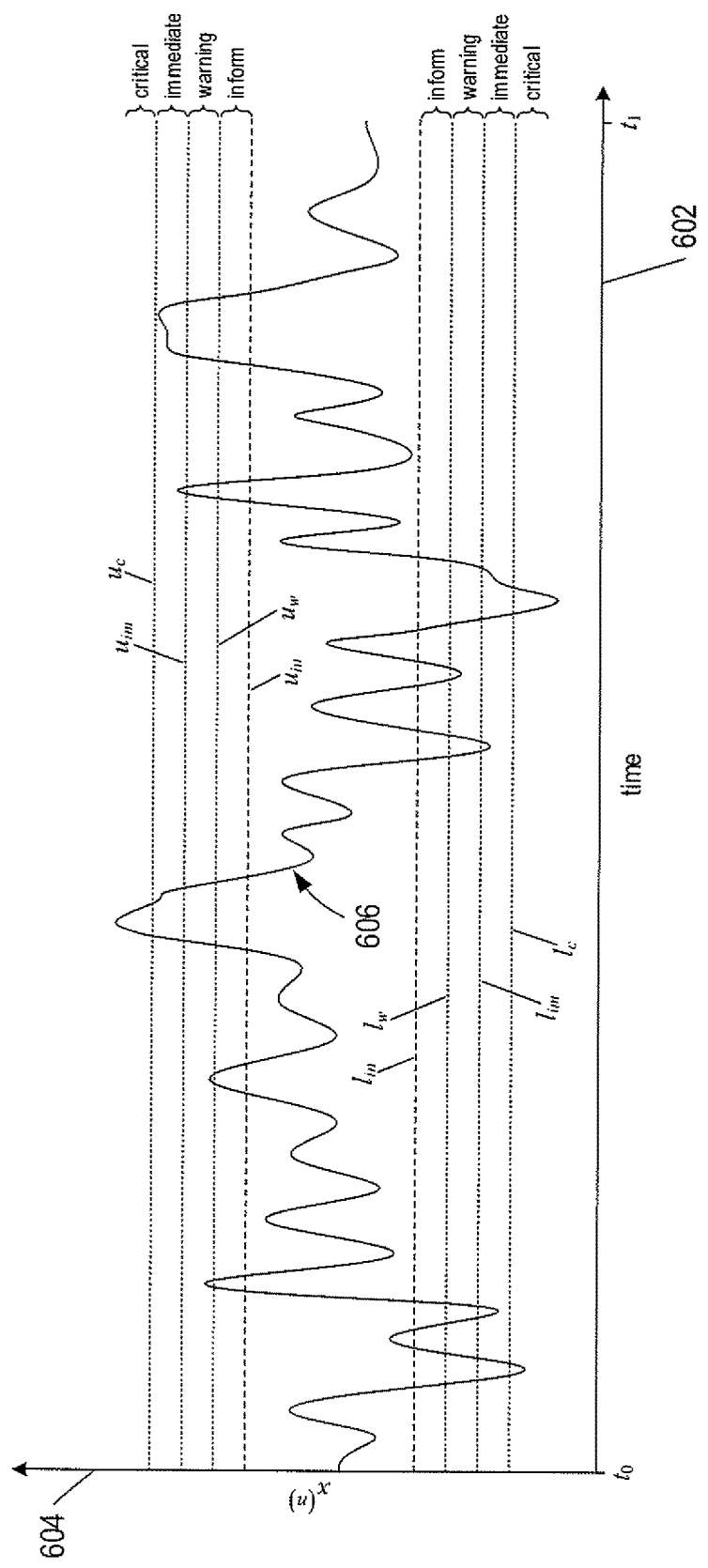
FIG. 7 shows a plot of the set of metric data with a series of upper thresholds and a series of lower thresholds.

FIG. 7 shows a plot of the set of metric data shown in FIG. 6 with four horizontal dashed lines labeled $u_{in}$, $u_w$, $u_{im}$, and $u_c$ that represent four upper thresholds and four horizontal dashed lines labeled $l_{in}$, $l_w$, $l_{im}$, and $l_c$ that represent four lower thresholds. The lowest upper threshold $u_{in}$ corresponds to the upper threshold U. The highest lower threshold $l_{in}$ corresponds to the lower threshold L. In FIG. 7, the four upper and lower thresholds define severity alert levels identified as "inform," "warning," "immediate," and "critical." Metric values in the inform level satisfy the following condition:

$$u_{in} \leq x_k^{(n)} < u_w \text{ or } l_{in} \geq x_k^{(n)} > l_w \qquad (8a)$$

and trigger "inform alerts" that indicate a problem with the object at the lowest alert level. Metric values in warning level satisfy the following condition:

$$u_w \leq x_k^{(n)} < u_{im} \text{ or } l_w \geq x_k^{(n)} > l_{im} \qquad (8b)$$

and trigger "warning alerts." Metric values in the immediate level satisfy the following condition:

$$u_{im} \leq x_k^{(n)} < u_c \text{ or } l_{im} \geq x_k^{(n)} > l_c \qquad (8c)$$

and trigger "immediate alerts." An immediate alert may indicate that the problem is an immediate threat to performance or use of the object. Metric values in the critical level satisfy the following condition:

$$u_c \leq x_k^{(n)} \text{ or } l_c \geq x_k^{(n)} \qquad (8d)$$

and trigger "critical alerts." A critical alert indicates the problem is of the highest alert level and remedial action needs to be taken.

In practice, prioritizing two or more objects for remedial action is often complicated when the objects have approximately the same alert level (i.e., the objects are equivalent in terms of the alert level), but differ with respect to the number of threshold violations. Instead of relying solely on alert level, a numerical object rank may be calculated for each object in order to rank order the objects according to frequency of threshold violations. An object rank may be calculated as follows:

$$O_{rank}(m) = \sum_{i=1}^{S} w_i p_i^{(m)} \qquad (9)$$

where
S is the number of alert levels;
$w_i$ is a weight at the i-th alert level; and
$p_i^{(m)}$ is a relative frequency of alerts at the i-th alert level.
For the four example alert levels described above, the number of alert levels is S=4. The weights may be selected to give more influence or weight to higher alert levels than to lower alert levels. The weight may be linear, exponential, or logarithmic function with respect to the alert level.

Figure 8:
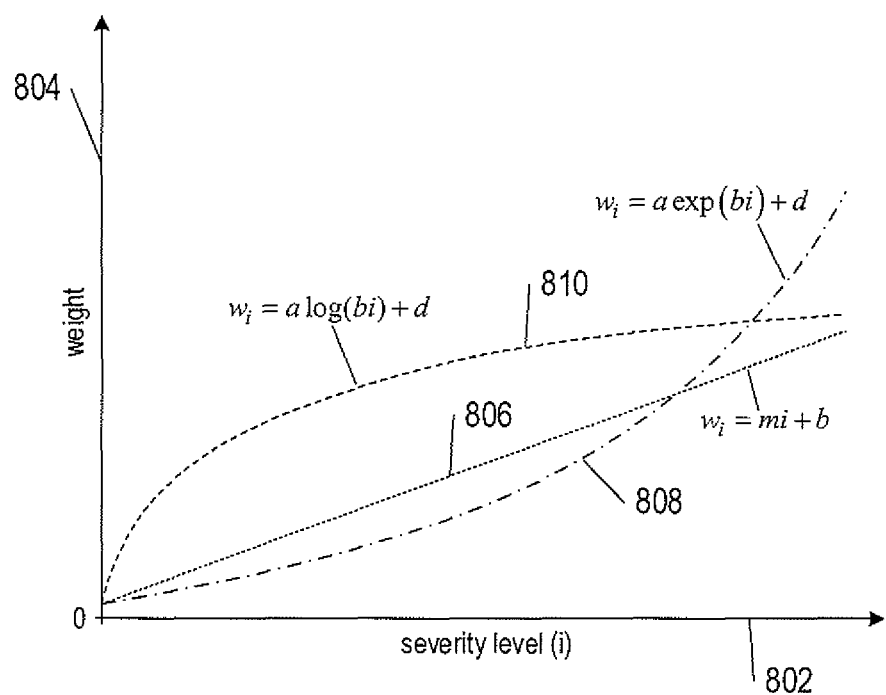
FIG. 8 shows plots of three different weight functions.

FIG. 8 shows plots of three different weight functions. Horizontal axis 802 represents the alert level. Vertical axis 804 represents the weight value. Dotted line 806 represents a linear weight function in which the influence of the weights on calculation of the object rank increases linearly with increasing alert level. Dot-dash line 808 represents an exponential weight function in which the influence of weights on calculation of the object rank increases exponentially with increasing alert level. Dashed line 810 represents a logarithmic weight function in which the influence of weights on calculation of the object rank increases gradually with increasing alert level.

The relative frequency $p_i^{(m)}$ of alerts of the m-th object in Equation (9) is given by:

$$p_i^{(m)} = \frac{v_i^{(m)}}{c_i^{(m)}} \tag{10}$$

where $v_i^{(m)}$ is a number of alerts for the m-th object at the i-th alert level; and $c_i^{(m)}$ is the number of all possible alerts for objects of the object kind at the i-th alert level.

The count $c_i^{(m)}$ is known for every object of the same object kind in the data center. The count $c_i^{(m)}$ is the number of preliminary or expected number of problem scenarios or problem conditions at the i-th alert. Objects of the same object kind have the same nature, characteristics, or are the same type of physical or virtual resource. For example, VMs running in the data center are objects of the same object kind; server computers, or hosts, are objects of the same object kind; and physical CPUs are objects of the same object kind.

Returning to the example of four upper and lower thresholds, let $v_1^{(m)}$ represent the number of metric values in the inform level, $v_2^{(m)}$ represent the number of metric values in the warning level, $v_3^{(m)}$ represent the number of metric values in the immediate level, and $v_4^{(m)}$ represent the number of metric values in the critical level. The subscripts "1," "2," "3," and "4" represent the four corresponding alert levels "inform," "warning," "immediate," and "critical." The following pseudocode represents a method of counting the number of alerts that lie in the four example alert levels for a set of metric data $x^{(n)}(t)$:

```
1   v_1^(m) = v_2^(m) = v_3^(m) = v_4^(m) = 0; // initialize alert level counts
2   for (k = 1; k ≤ K; k ++) {
3       if (u_in ≤ x_k^(n) < u_w or l_in ≥ x_k^(n) > l_w)
4           v_1^(m) += 1;
5       if (u_w ≤ x_k^(n) < u_im or l_w ≥ x_k^(n) > l_im)
6           v_2^(m) += 1;
7       if (u_im ≤ x_k^(n) < u_c or l_im ≥ x_k^(n) > l_c)
8           v_3^(m) += 1;
9       if (u_c ≤ x_k^(n) or l_c ≥ x_k^(n))
10          v_4^(m) += 1;
11  }
```

Figures 9A, 9B:
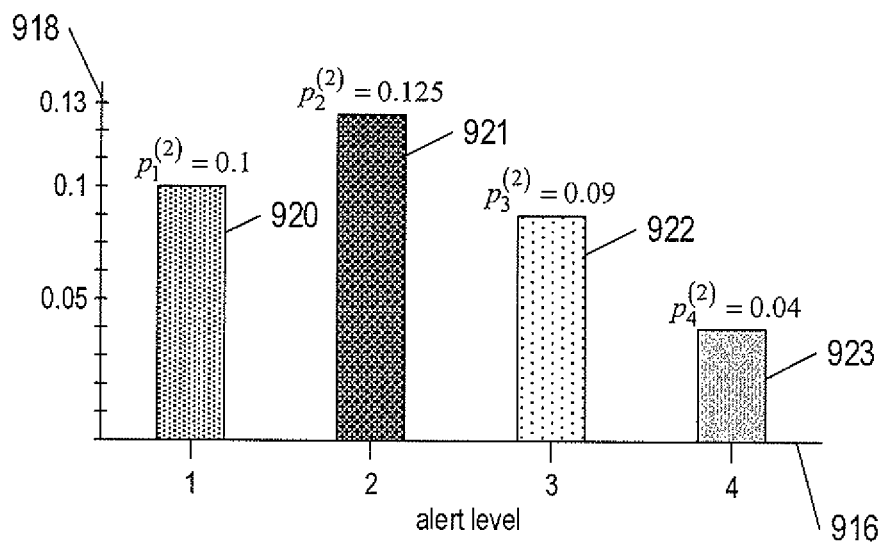
FIG. 9A shows an example of calculating a relative frequency for an object.
FIG. 9B shows a distribution of relative frequencies for an object.

FIG. 9A shows an example calculation of a relative frequency for an object of a set of six objects of the same object kind. Table of alerts 902 includes a column labeled "Objects" that list six objects of the same object kind. Columns 905-908 list the number of alerts for each of the four alert levels associated with each of the objects.

FIG. 9B shows an example distribution of relative frequencies for the object $O_2$. Horizontal axis represents 916 alert level. Vertical axis 918 represents a range of relative frequency values. Bars 920-923 represent example relative frequencies of the four severity shown in FIG. 9A.

In order to estimate an object's performance over time in terms of alert trends, an object trend is calculated at two time stamps of a time interval:

$$O_{trend}(m) = \sum_{i=1}^{S} w_i (p_i^{(m)}(t_1) - p_i^{(m)}(t_2)) \tag{11}$$

where $t_1$ and $t_2$ are time stamp limits of a time interval $[t_1, t_2]$.

The object trend is a weight sum of differences between corresponding relative frequencies calculated at two different time stamps.

Figure 10:
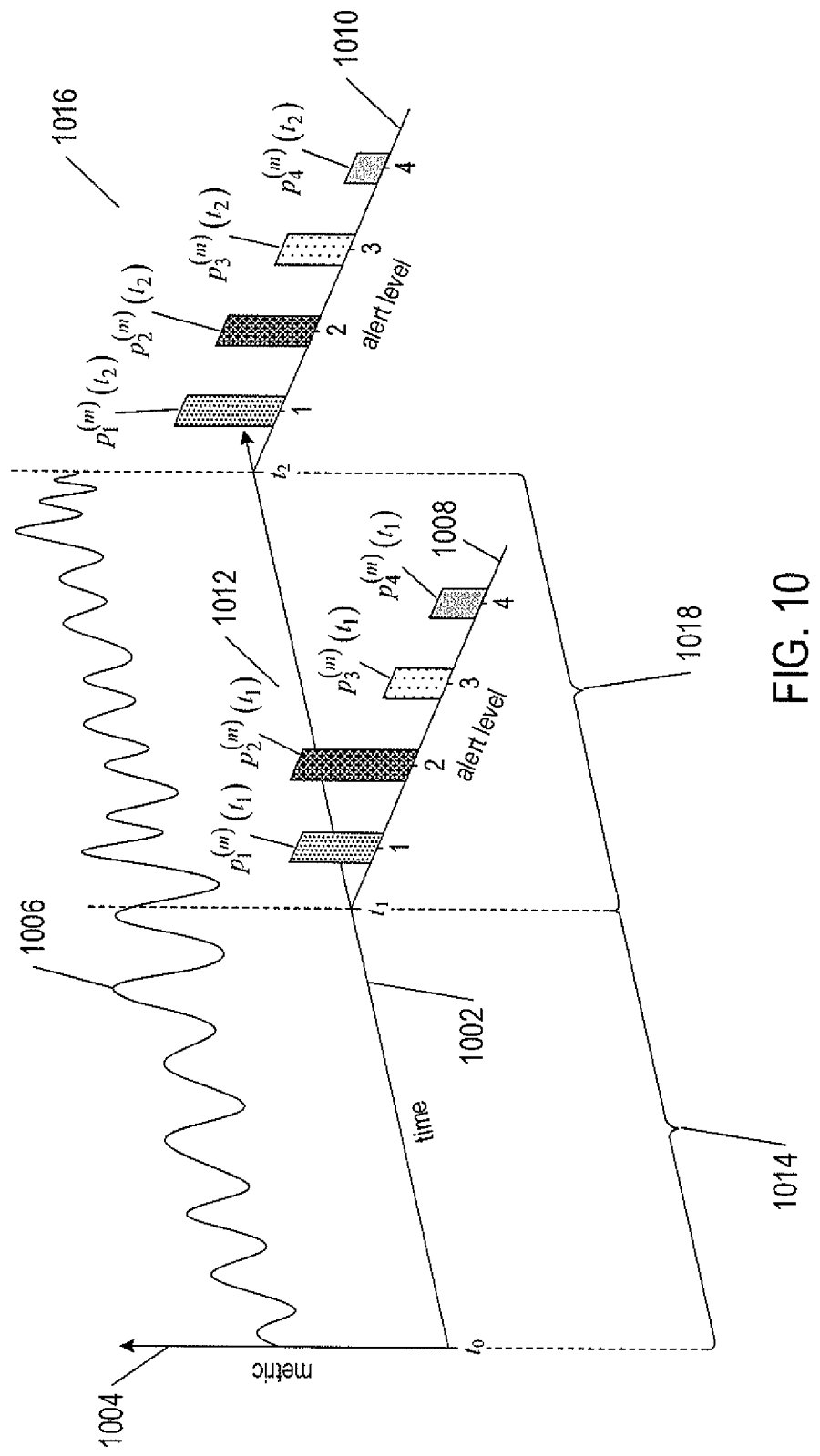
FIG. 10 shows two distributions of relative frequencies at two different time stamps.

FIG. 10 shows two distributions of relative frequencies calculated at two different time stamps. Axis 1002 represents time and axis 1004 represents a range of metric values for a metric associated with an object $O_m$. Curve 1006 represents a set of metric data generated by the object over time. Axes 1008 and 1010 represent alert levels. A first relative frequency distribution 1012 is calculated from the set of metric data generated over a time interval $[t_0, t_1]$ 1014 for the four alert levels. A second relative frequency distribution 1016 is calculated from the set of metric data generated over a time interval $[t_1, t_2]$ 1018 for the four alert levels. The object trend is calculated for the two time stamps $t_1$ and $t_2$ as follows:

$$O_{trend}(m) = \sum_{i=1}^{4} w_i (p_i^{(m)}(t_1) - p_i^{(m)}(t_2)) \tag{12}$$

The object rank may be used to prioritize objects for remedial action. An object with a higher object rank has a higher priority for remedial action than another object with a lower object rank. For example, a first server computer with an object rank, $O_{rank}$ (host 1), that is greater than an object rank, $O_{rank}$ (host 2), of a second server computer would be listed ahead of the second server computer and may receive remedial action before the second server computer.

The object trend may also be used to prioritize objects for remedial action. An object with a large object trend has higher priority for remedial action than another object with a smaller object trend. For example, a first server computer with an object trend, $O_{trend}$(host 1), that is greater than an object trend, $O_{trend}$(host 2), of a second server computer would be listed ahead of the second server computer and may receive remedial action before the second server computer. Therefore, the first server computer would be listed ahead of the second server computer and may receive remedial action before the second server computer.

Figure 11:
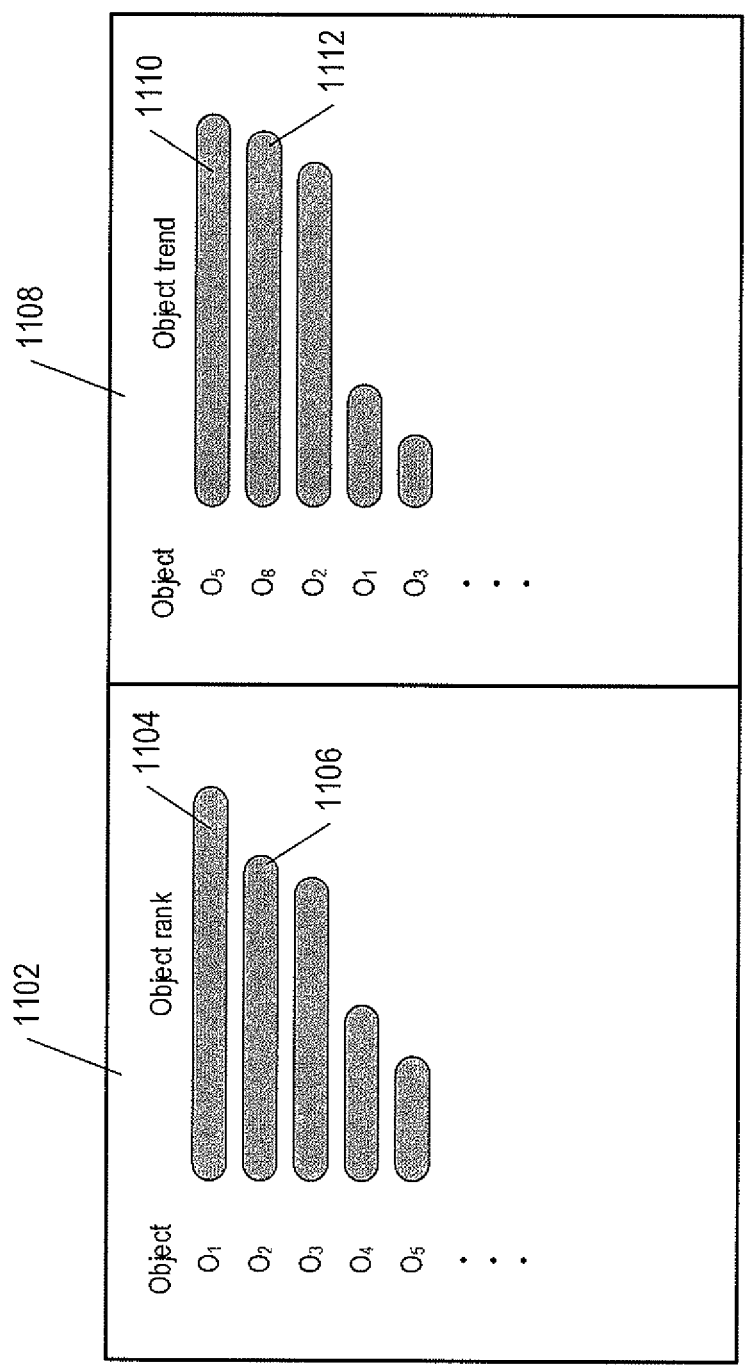
FIG. 11 shows an example of object ranks and object trends displayed in separate panels of a graphical user interface.

FIG. 11 shows an example of object ranks and object trends displayed in separate panels of a graphical user interface. The object ranks and object trends are displays as bars in bar graphs. In panel 1102, objects are listed in decreasing order by object rank. Object $O_1$ has the largest object rank represented by bar 1104, and object $O_2$ has the second largest object rank as represented by shorter length bar 1106. In panel 1108, objects are listed in decreasing order by object trend. Object $O_5$ has the largest object trend represented by bar 1110, and object $O_8$ has the second largest object rank as represented by shorter length bar 1112. Based on the object ranks listed in panel 1102, object $O_1$ would receive remedial action before object $O_2$. Based on the object trends listed in panel 1108, object $O_5$ would receive remedial action before object $O_8$. In this example, even though object $O_5$ has the largest object trend, because object $O_1$ has a larger object rank than object $O_5$, therefore object $O_1$ may be granted the highest priority for remedial action. Objects at the top of both rank and trend lists are regarded as high priorities for remedial action.

Recurrence alert values, alert frequencies, and average alert duration are also calculated in order to rank the alerts and identify which associated objects may be in need of remedial action. A recurrence alert value of an i-th alert for the m-th object is calculated as a relative frequency of the i-th alert for the object with respect to a sum of a total number of alerts generated for the same object. A recurrence alert value is calculated as follows:

$$\text{Recurrence\_alert}(i) = \frac{v_i^{(m)}}{\sum_{i=1}^{S} v_i^{(m)}} \qquad (13a)$$

The recurrence alert value may be used to determine an excessive number of recurring alerts for an object, which indicates the object may be in need of remedial action. For each alert level, the recurrence alert value is compared with an associated recurrence-alert threshold to determine if remedial action is required. For each alert level, when the following condition is satisfied, $$\text{Recurrence\_alert}(i) \geq T_{rec}(i) \qquad (13b)$$

where $T_{rec}(i)$ is the recurrence-alert threshold for the i-th alert level, a notice may be generated indicating that an alert with i-th alert level is recurring, calling attention to the m-th object.

An alert frequency is a frequency of an alert for objects of the same object kind. The alert frequency may be calculated as the number of times an alert has occurred for objects of the same object kind divided by the number of all alerts for objects of the same object kind. The alert frequency of the i-th alert generated by objects of the same object kind is given by:

$$\text{Alert\_freq}(i) = \frac{\sum_{m'=1}^{M'} v_i^{(m')}}{\sum_{i=1}^{S} \sum_{m'}^{M'} v_i^{(m')}} \qquad (14a)$$

The alert frequency may be used to determine how frequently different alert level violations occur for objects of the same object kind. For each alert level, when the following condition is satisfied, $$\text{Alert\_freq}(i) \geq T_{alert}(i) \qquad (14b)$$

where $T_{alert}(i)$ is the alert-frequency threshold for the i-th alert level, a notice may be generated indicating that alert associated with the i-th alert level occurs with a high frequency for objects of the same object kind.

An average alert duration for the m-th object may be calculated as follows:

$$\text{Ave\_alert\_dur}(m) = \frac{1}{X} \sum_{x=1}^{X} (t_{cancel}^{alert}(x) - t_{start}^{alert}(x)) \qquad (15a)$$

where
$t_{start}^{alert}(x)$ is a start time of the x-th alert;
$t_{cancel}^{alert}(x)$ is a cancel time of the x-th alert (i.e., alert has ended); and
X is the number of time intervals with alerts in a time period.

The average alert duration may be used to determine which objects have unacceptably long alert durations. For each object, when the following condition is satisfied, $$\text{Ave\_alert\_dur}(m) \geq T_{alert-dur} \qquad (15b)$$

where $T_{alert-dur}$ is the average-alert-duration threshold, a notice may be generated that indicates that the duration of alerts associated with the m-th object are not acceptable. In other words, violation of the threshold $T_{alert-dur}$ may be an indication that the problems indicated by the alerts are not being resolved within an acceptable period of time. Note that the average duration may also be calculated for each alert level and may calculate which portion of (15a) is the average duration of alerts of the i-th alert level.

An average alert duration for the M' objects of the same object kind may be calculated as follows:

$$\text{Ave\_alert\_dur}(\text{object\_kind}) = \qquad (16a)$$
$$\frac{1}{M'} \frac{1}{X} \sum_{m'=1}^{M'} \sum_{x=1}^{X} (t_{cancel}^{alert}(x, m') - t_{start}^{alert}(x, m'))$$

where
$t_{start}^{alert}(x, m')$ is a start time of the x-th alert for the m'-th object; and
$t_{cancel}^{alert}(x, m')$ is a cancel time of the x-th alert for the m'-th object.

The average alert duration for a set of objects of the same object kind may be used to determine which objects of the same object kind have collectively unacceptably long alert durations. For the set objects, when the following condition is satisfied, $$\text{Ave\_alert\_dur}(\text{object\_kind}) \geq T_{alert-dur-ok} \qquad (16b)$$

where $T_{alert-dur-ok}$ is the average-alert-duration threshold for the set of objects of the same object kind, a notice may be generated indicating that the collective duration of the alerts associated with the set of objects of the same object kind are too long. In other words, violation of the average-alert-duration threshold $T_{alert-dur-ok}$ for the set of objects may be an indication that the problems associated with an entire set of objects of the same object kind are not being resolved within an acceptable period of time.

The recurrence alert values, alert frequencies, and average alert duration may be used to rank alerts or identify alerts that are in need of attention. Alerts with one or more of the highest recurrence alert values, alert frequencies, and average alert duration have the highest priority for remedial action. Alerts may be ranked in decreasing order of recurrence alert value, decreasing order of alert frequencies, and decreasing order of alert duration.

Data center super indicators are calculated to quantify data center infrastructure management efficiency. Super indicators provide additional reporting capabilities for IT administrators. The super indicators include a problem-free lifetime of an object, average remediation time of an object, and volatility of health of an object.

The problem-free lifetime value of an object is an average of the time intervals when the object did not experience an alert:

$$\text{Prob-free\_LT}(m) = \frac{1}{Y} \sum_{y=1}^{Y} (t_{end}^{no\,alert}(y) - t_{start}^{no\,alert}(y)) \qquad (17a)$$

where
$t_{start}^{no\,alert}(y)$ is a start time of a time interval without an alert;
$t_{end}^{no\,alert}(y)$ is a end time of the time interval without an alert; and
Y is the number of time intervals without an alert.

Figure 12:
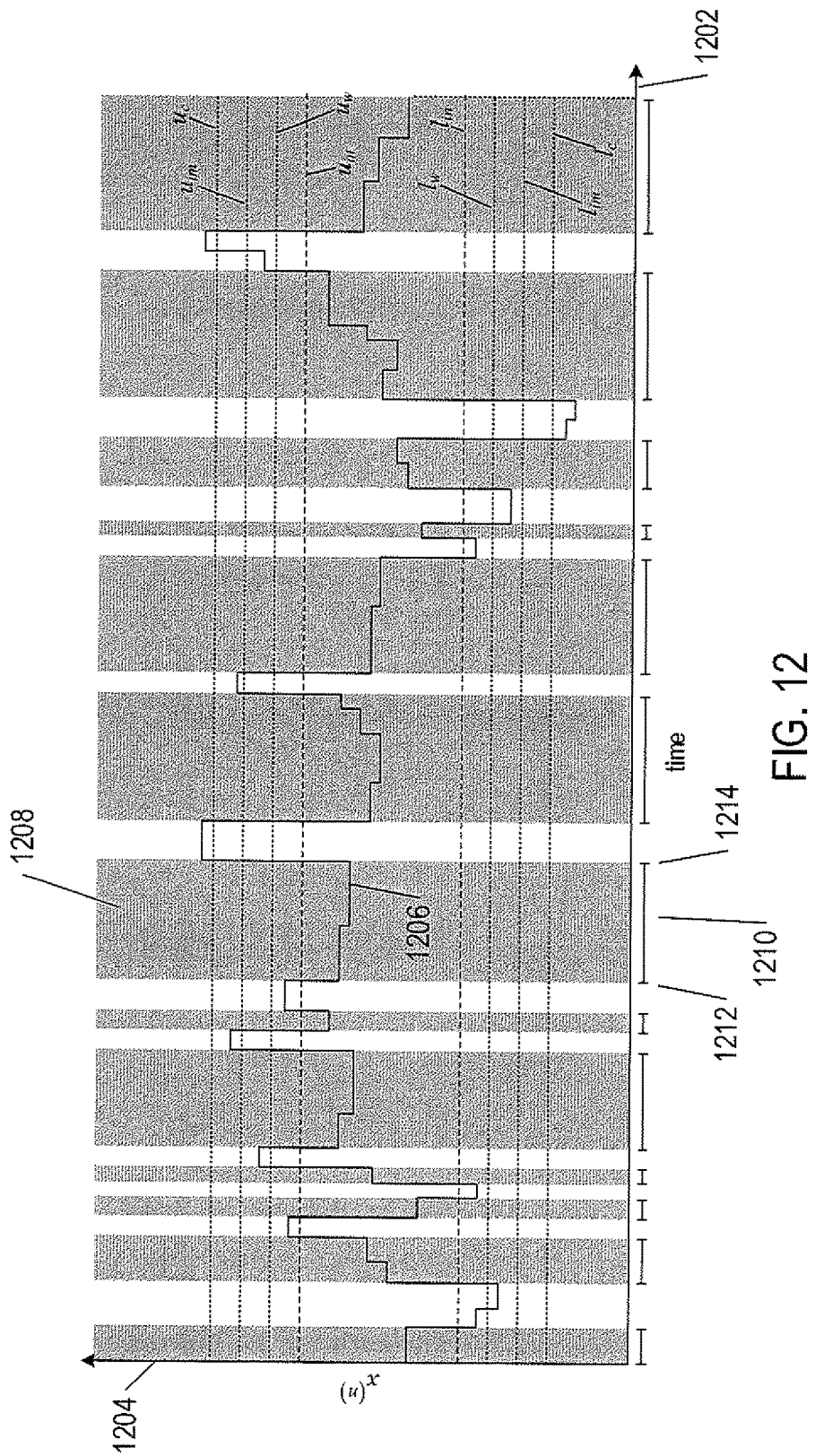
FIG. 12 shows a plot of a set of metric data.

FIG. 12 shows a plot of a set of metric data. Horizontal axis 1202 represents a period of time. Vertical axis 1204 represents a range of metric values. Curve 1206 represents a set of metric data associated with an object generated over a period of time. FIG. 12 includes the four upper thresholds labeled $u_{in}$, $u_w$, $u_{im}$, and $u_c$ and four lower thresholds labeled $l_{in}$, $l_w$, $l_{im}$, and $l_c$. Shaded regions, such as shaded region 1208, identify portions of the set of metric data that do not violate the upper and lower thresholds. Line segments, such as line segment 1210, represent time intervals of the period of time in which the set of metric data does not violate the upper and lower thresholds. For example, time stamp 1212 represents a start time $t_{start}^{no\ alert}$ of the time interval 1210 and time stamp 1214 represents an end time $t_{end}^{no\ alert}$ of the time interval 1210. The duration (i.e., $t_{end}^{no\ alert} - t_{start}^{no\ alert}$) of each time interval where the set of metric data does not violate the upper and lower thresholds are average to obtain the problem-free lifetime of the object.

When the problem-free lifetime of an object is less than an acceptable problem-free threshold represented by the following condition $$T_{prob\text{-}free} \geq \text{Prob-free\_LT}(m) \quad (17b)$$

where $T_{prob\text{-}free}$ is the problem-free threshold, a notice may be generated that indicates the amount of time the object is problem free is not acceptable and remedial action may be required.

An average remediation time of an object is the average of all alert durations for an object and may be calculated as follows:

$$\text{Remediation\_time}(m) = \frac{1}{N_{tot}} \sum_{i=1}^{N_{tot}} \text{Duration\_alert}(i) \quad (18a)$$

where $$\text{Duration\_alert}(i) = \sum_{n=1}^{N_i} (t_{cancel}^{alert}(n, i) - t_{start}^{alert}(n, i)) \quad (18b)$$

$t_{start}^{alert}(n, i)$ is a start time of the i-th alert level alert;
$t_{cancel}^{alert}(n, i)$ is a cancel time of the i-th alert level alert;
$N_i$ is the number of i-th alert level alerts; and
$N_{tot} = \Sigma_i N_i$.

The quantity Duration_alert(i) is a total duration of the time intervals associated with the i-th level alerts. The remediation time is an indication of the amount of time an object spends in an alert status.

Figure 13A:
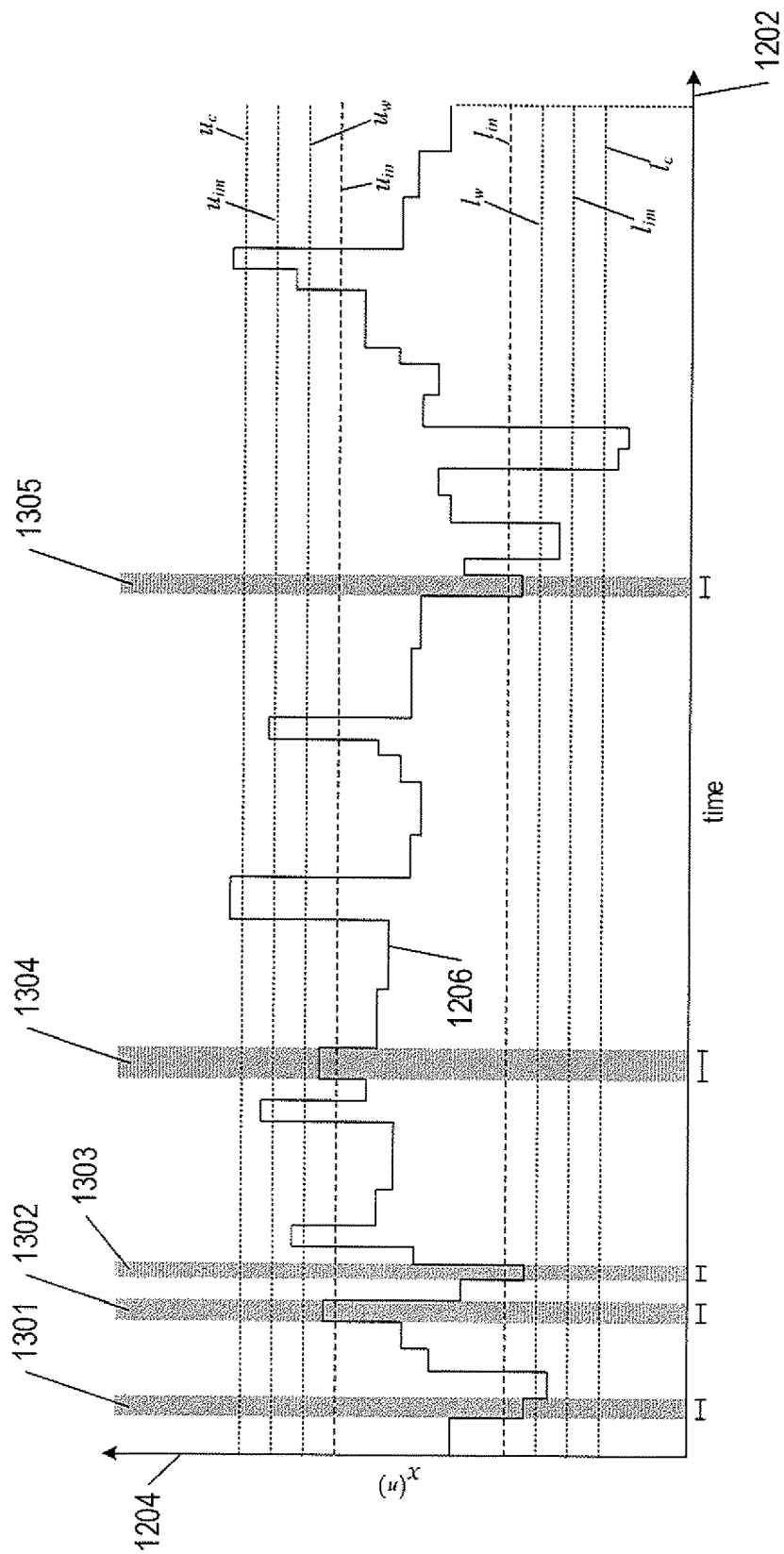
FIGS. 13A-13D show time intervals of four severity alerts for a set of metric data.
Figure 13B:
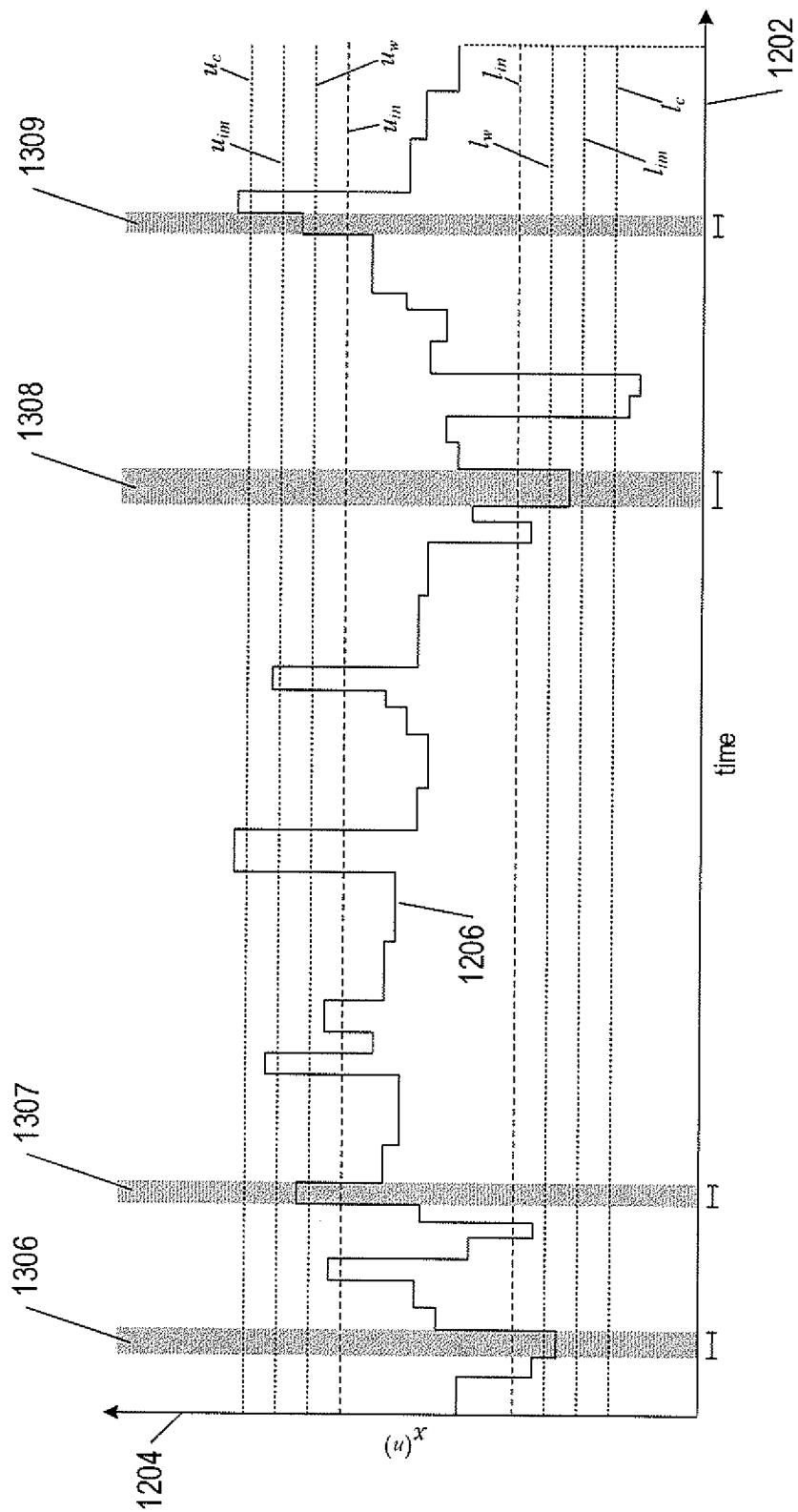
Figure 13C:
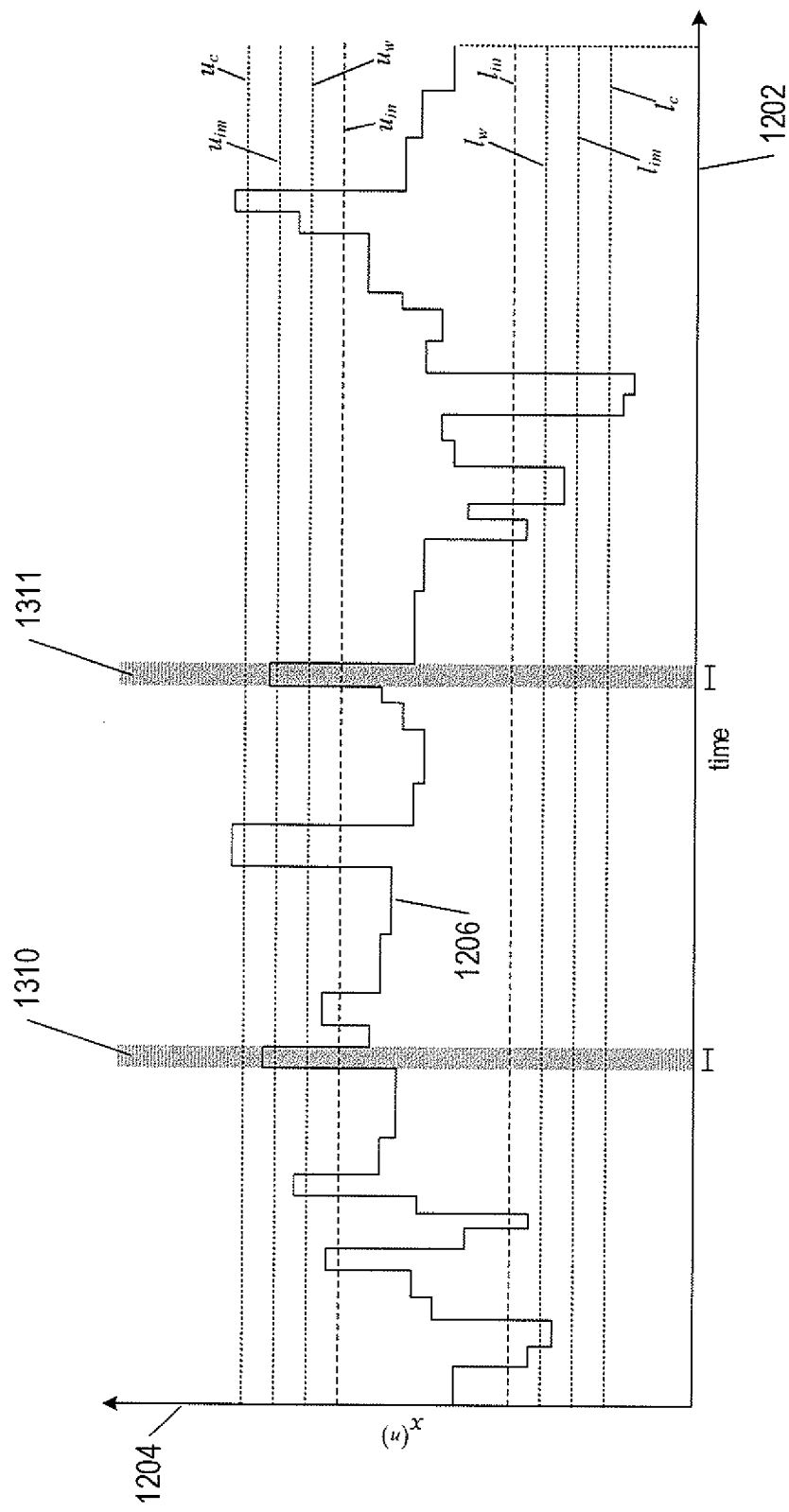
Figure 13D:
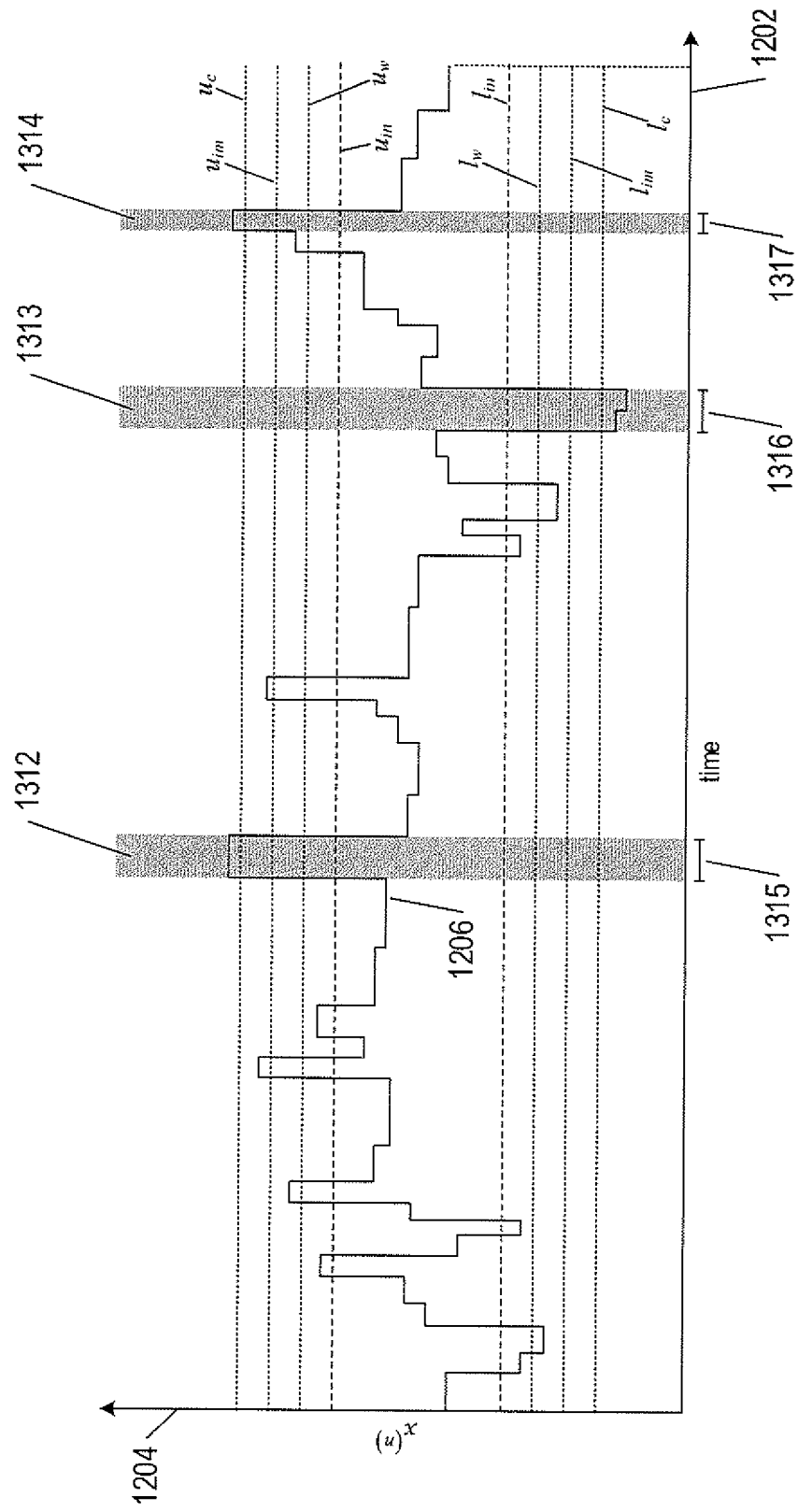

FIGS. 13A-13D show time intervals of the four severity alerts (inform, warning, immediate, and critical) for the set of metric data 1206 shown in FIG. 12. In FIGS. 13A-13D, shaded regions identify portions of the set of metric data 1206 that violate the upper and lower thresholds. In FIG. 13A, shade regions 1301-1305 identify portions of the set of metric data 1206 that generate inform alerts. The number of inform alerts is $N_1=5$. In FIG. 13B, shade regions 1306-1309 identify portions of the set of metric data 1206 that generate warning alerts. The number of warning alerts is $N_2=4$. In FIG. 13C, shade regions 1310 and 1311 identify portions of the set of metric data 1206 that generate immediate alerts. The number of immediate alerts is $N_3=2$. In FIG. 13D, shade regions 1312-1314 identify portions of the set of metric data 1206 that generate critical alerts. The number of inform alerts is $N_4=3$. The time intervals associate with each alert level are summed to obtain an alert duration as represented by Equation (18b). For example, line segments 1315-1317 in FIG. 13D represent the durations of the time intervals of each of the critical alerts. The durations of these time intervals 1315-1317 are summed to obtain a total duration of the critical alerts, Duration_alert(4), where i=4 represents a critical alert. The remediation time for the object associate with the set of metric data 1206 is calculated according to Equation (18a) as follows:

$$\text{Remediation\_time}(m) = \frac{1}{14} \sum_{i=1}^{4} \text{Duration\_alert}(i) \quad (19)$$

When the remediation time of an object is less than an acceptable remediation-time threshold represented by the following condition $$T_{rem\text{-}time} \geq \text{Remediation\_time}(m) \quad (20)$$

where $T_{rem\text{-}time}$ is the remediation-time threshold, a notice may be generated indicating that the total duration of the alerts generated by the object is not acceptable.

The volatility of an object is calculated as the standard deviation of three badge metrics of the object and data center. The three badge metrics are health, risk and efficiency metrics. The health badge is a measure of how well a particular object, such as a VDC, host, VM, or cluster, is performing. The health badge is a weighted combination of workload, anomalies and faults badges. The higher a health score, the better the performance of the object or data center. The risk badge score is a combination of stress, time remaining and capacity remaining. The efficiency badge score is a weighted combination of reclaimable waste and density. The three badges may be used to generate a report on health, risk, and efficiency of objects and the data center overall. Highly volatile objects in terms of health, risk, and efficiency require a specialized care and management policy in order to classify, isolate and investigate possible causes of unstable behavior. For example, an object with a low problem-free lifetime may be classified as historically poorly performing and in need of remedial action, The standard deviation of a badge metric is calculated as follows:

$$\sigma^{(n)} = \sqrt{\frac{1}{K-1} \sum_{k=1}^{K} (x_k^{(n)} - \mu^{(n)})^2} \quad (21a)$$

where the mean value of the set of metric data is given by:

$$\mu^{(n)} = \frac{1}{K} \sum_{k=1}^{K} x_k^{(n)} \quad (21b)$$

Figure 14:
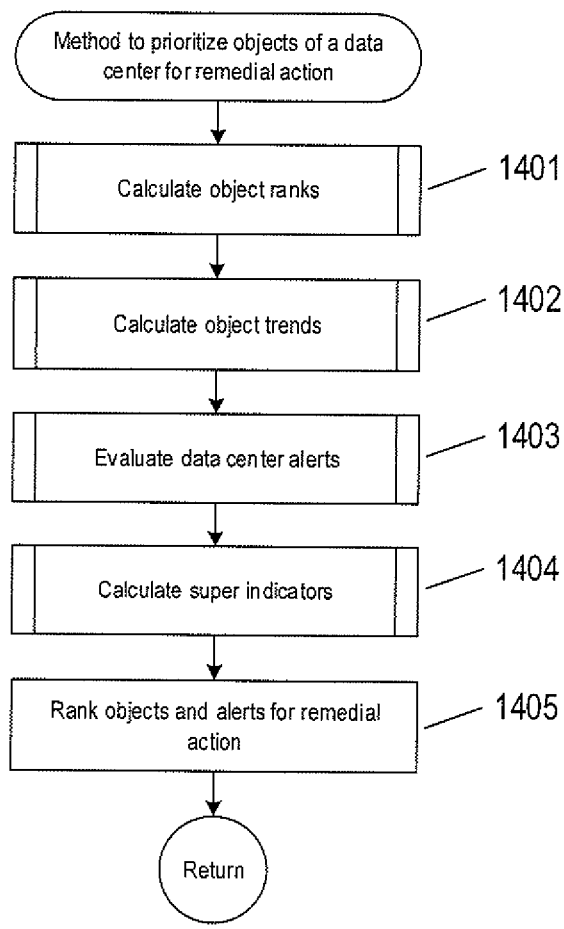
FIG. 14 shows a flow diagram of a method to rank data center objects and alerts based on trends.

FIG. 14 shows a flow diagram of a method to prioritize objects of a data center for remedial action. In block 1401, a routine "calculate object ranks" is called to calculate object ranks for objects of the data center. In block 1402, a routine "calculate object trends" is called to calculate object trends for objects of the data center. In block 1403, a routine "evaluate data alerts" is called to calculate recurrence alert values, alert frequencies, and average alert durations. In block 1404, a routine "calculate super indicators" is called indicators to quantify data center infrastructure management efficiency. In block 1405, objects and alert are ranked for remedial action based on the object ranks, trends, and evaluation of alerts.

Figure 15:
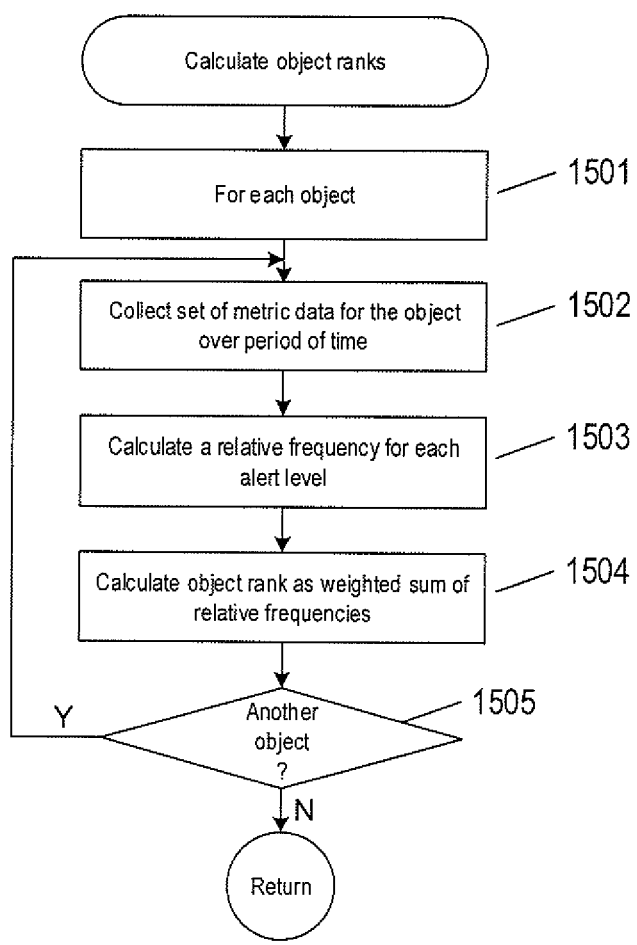
FIG. 15 shows a control-flow diagram of a routine "calculate objects ranks" called in FIG. 14.

FIG. 15 shows a control-flow diagram of the routine "calculate objects ranks" called in block 1401 of FIG. 14. A for-loop beginning with block 1501 repeats the operations represented by blocks 1502-1505 for each object. In block 1502, a set of metric data is collected over a period of time. In block 1503, a relative frequency is calculated for each alert level as described above. In block 1504, the object rank of the object is calculated as described above with reference to Equation (9). In decision block 1505, the operations of blocks 1502-1504 are repeated for another object.

Figure 16:
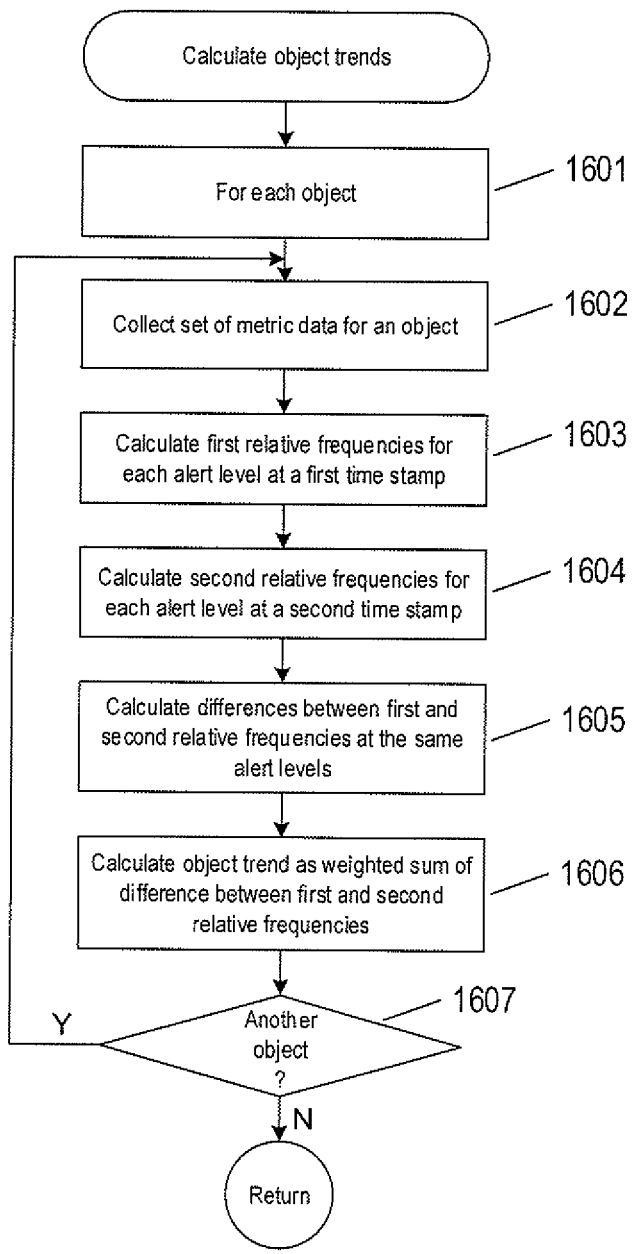
FIG. 16 shows a control-flow diagram of a routine "calculate object trends" called in FIG. 14.

FIG. 16 shows a control-flow diagram of the routine "calculate object trends" called in block 1403 of FIG. 14. A for-loop beginning with block 1601 repeats the operations represented by blocks 1602-1507 for each object. In block 1602, a set of metric data is collected over a period of time. In block 1603, first relative frequencies are calculated for each alert level for the set of metric data up to a first time stamp, as described above with reference to Equations (10) and FIG. 10. In block 1604, second relative frequencies are calculated for each alert level for the set of metric data up to a second time stamp, as described above with reference to Equations (10) and FIG. 10. In block 1605, the object rank of the object is calculated as described above with reference to Equation (9). In decision block 1505, the operations of blocks 1502-1504 are repeated for another object.

Figure 17:
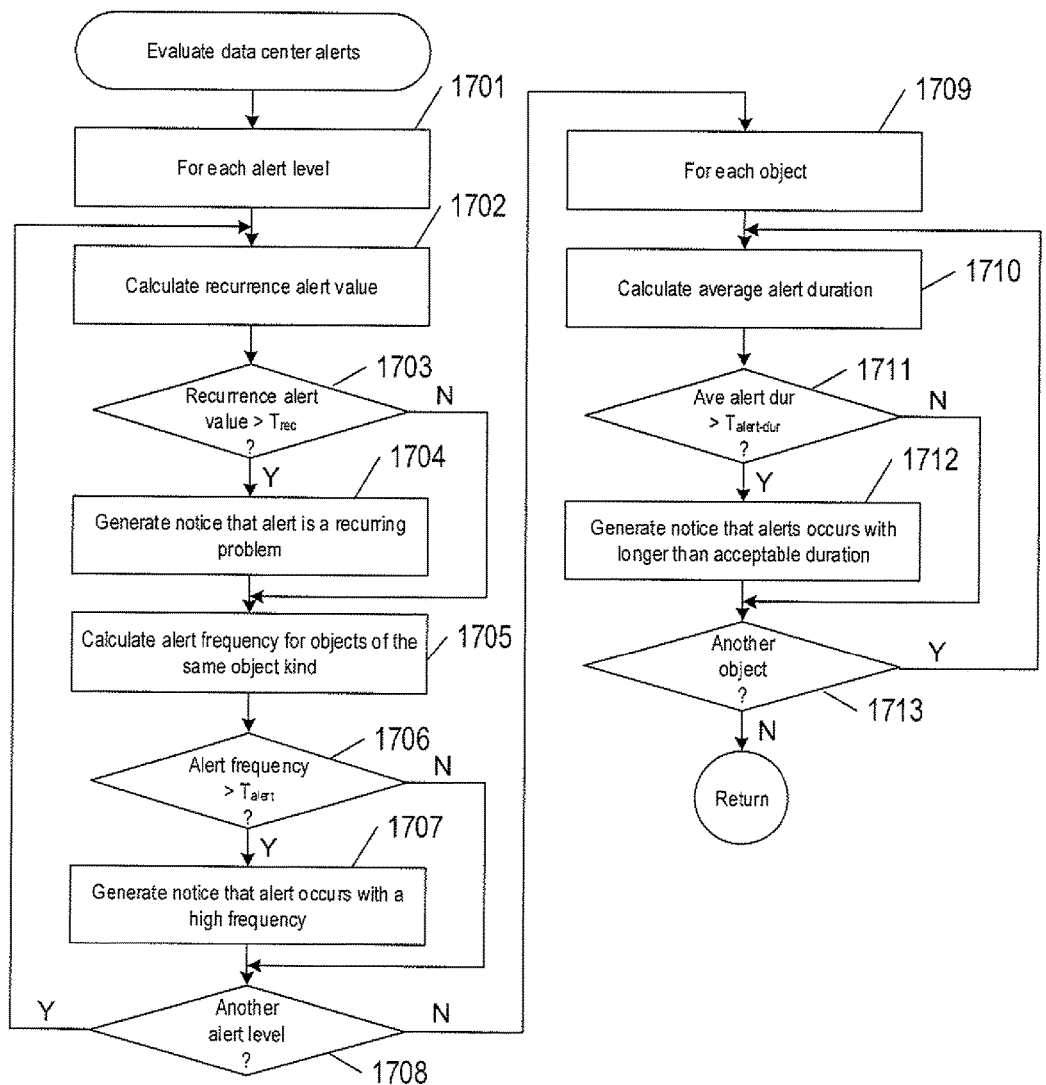
FIG. 17 shows a control-flow diagram of a routine "evaluate objects and trends" called in FIG. 14.

FIG. 17 shows a control-flow diagram of the routine "evaluate objects and trends" called in block 1403 of FIG. 14. A for-loop beginning with block 1701 repeats the operations represented by blocks 1702-1708. In block 1702, a recurrence alert value is calculated as described above with reference to Equation (13a). In decision block 1703, when the recurrence alert value is greater than a recurrence-alert threshold, control flows to block 1704 in which a notice is generated indicating that an alert associated with alert level is recurring. In block 1705, an alert frequency is calculated as described above with reference to Equation (14a). In decision block 1706, when the alert frequency is greater than an alert-frequency threshold, control flows to block 1707 and a notice is generated that indicates that the alert associated with the alert level occurs with a high frequency for objects of the same object kind. In decision block 1708, the operations represented by blocks 1702-1707 are repeated for another alert level. A for-loop beginning with block 1709 repeats the operations represented by blocks 1710-1712 for each object. In block 1710, an average alert duration is calculated for the object as described above with, reference to Equation (15a). In decision block 1711, when the average alert duration is less than an average-alert-duration threshold, control flows to block 1712 and a notice is generated that indicates the duration of alerts associated with the object are not acceptable. In decision block 1713, the operations represented by blocks 1702-1713 are repeated for another object.

Figure 18:
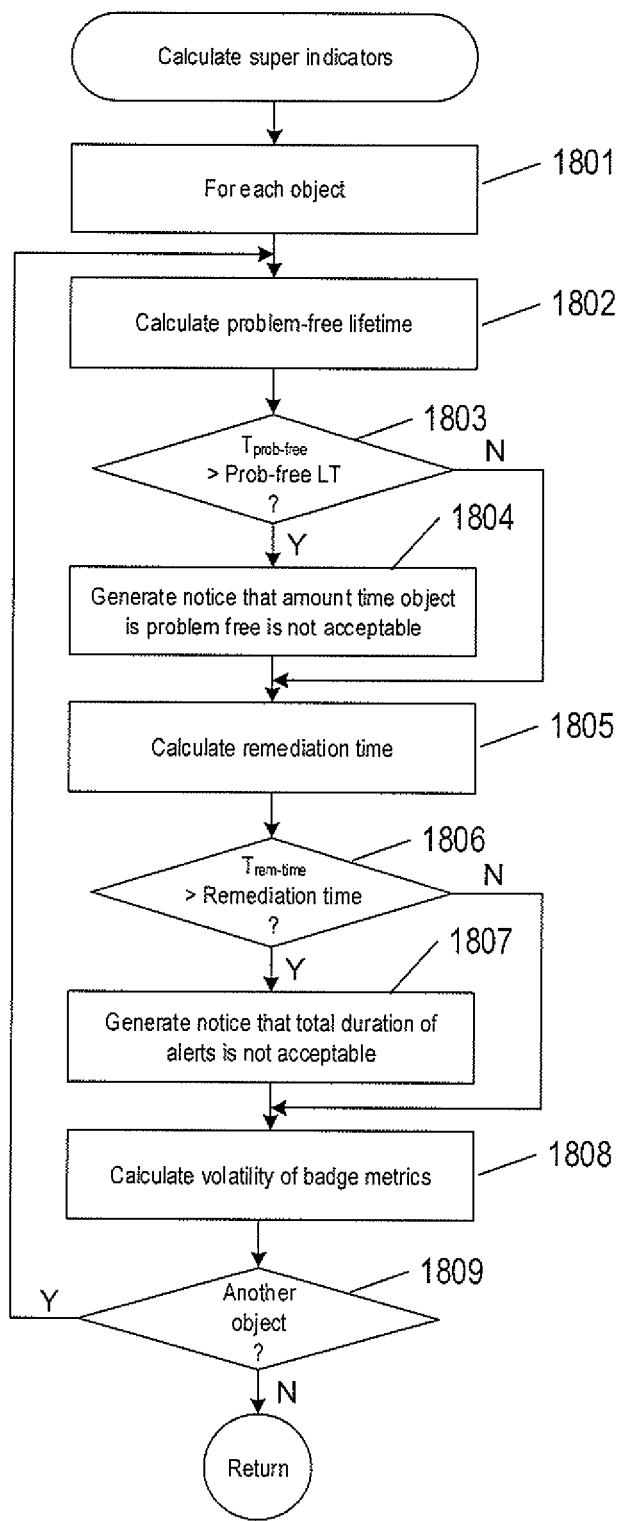
FIG. 18 shows a control-flow diagram of a routine "calculate super indicators" called in FIG. 14.

FIG. 18 shows a control-flow diagram of the routine "calculate super indicators" called in block 1404 of FIG. 14. A for-loop beginning with block 1801, repeats the operations represented by blocks 1802-1809 for each object. In block 1802, a problem-free lifetime is calculated as described above with reference to Equation (17a). In decision block 1803, when the problem-free lifetime is less than a problem-free threshold, control flows to block 1804 and a notice is generated that indicates the amount of time the object is problem free is not acceptable. In block 1805, a remediation time is calculated as described above with reference to Equations (18a)-(18b). In decision block 1806, when the remediation time is less than a remediation-time threshold, control flows to block 1807 and a notice is generated that indicates the total duration of the alerts generated by the object is not acceptable. In block 1808, volatility of badge metrics is calculated as described above with reference to Equations (21a)-(21b). In decision block 1809, blocks 1802-1808 are repeated for another object.

Figure 19:
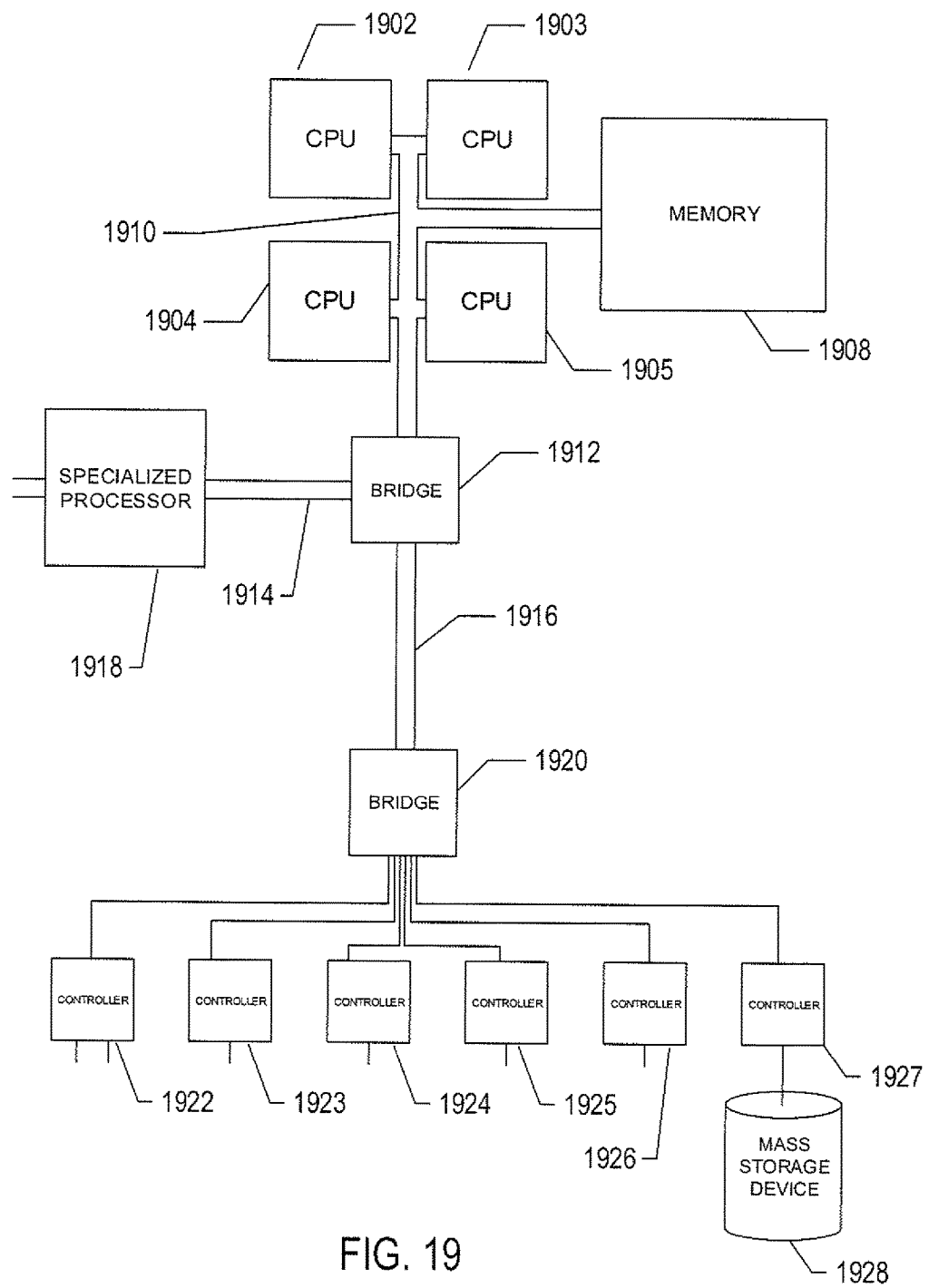
FIG. 19 shows an architectural diagram for various types of computers that may be used to evaluate importance of data center metrics.

FIG. 19 shows an architectural diagram for various types of computers that may be used to evaluate importance of data center metrics. Computers that receive, process, and store event messages may be described by the general architectural diagram shown in FIG. 19, for example. The computer system contains one or multiple central processing units ("CPUs") 1902-1905, one or more electronic memories 1908 interconnected with the CPUs by a CPU/memory-subsystem bus 1910 or multiple busses, a first bridge 1912 that interconnects the CPU/memory-subsystem bus 1910 with additional busses 1914 and 1916, or other types of high-speed interconnection media, including multiple, high-speed serial interconnects. These busses or serial interconnections, in turn, connect the CPUs and memory with specialized processors, such as a graphics processor 1918, and with one or more additional bridges 1920, which are interconnected with high-speed serial links or with multiple controllers 1922-2127, such as controller 1927, that provide access to various different types of mass-storage devices 1928, electronic displays, input devices, and other such components, subcomponents, and computational devices. The methods described above are stored as machine-readable instructions in one or more data-storage devices that when executed cause one or more of the processing units 1902-1905 to carried out the instructions as described above. It should be noted that computer-readable data-storage devices include optical and electromagnetic disks, electronic memories, and other physical data-storage devices.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. In a process that prioritizes objects of a data center for application of remedial actions to correct performance problems with the objects, the specific improvement comprising:
   calculating an object rank of each object of the data center over a period of time, wherein each object rank is calculated as a weighted function of relative frequencies of alerts that occur within the period of time for the object;
   calculating an object trend of each object of the data center, wherein each object trend is calculated as a weighted function of differences between a first relative frequency of alerts at a first time stamp and second relative frequency of alerts at a second time stamp for the object;
   determining an order of priority of the objects for applying remedial actions based on the object ranks and object trends; and
   executing the remedial actions based on the order of priority, thereby correcting performance problems of the objects.

2. The process of claim 1, wherein calculating the object rank of each object of the data center comprises:
   for each alert level, calculating the first relative frequency of alerts as a ratio of number of alerts for the object at the alert level and number of all possible alerts for objects of the same object kind over the period of time; and
   summing a product of the weight and the relative frequency to generate the object rank, wherein the weights increase with increasing alert level.

3. The process of claim 1, wherein calculating the object trend of each object of the data center comprises:
   calculating the first relative frequency of alerts as a ratio of number of alerts for the object at the alert level and number of all possible alerts for objects of the same object kind over a first period of time that ends at the first time stamp;
   calculating the second relative frequency of alerts as a ratio of number of alerts for the object at the alert level and number of all possible alerts for objects of the same object kind over a second period of time that ends at the second time stamp; and
   summing a product of the weight and the difference between the first and second relative frequencies, wherein the weights increase with increasing alert level.

4. The process of claim 1 wherein generating the notices that identify alert levels associated with the priorities comprises:
   for each alert,
      calculating a recurrence frequency of an alert for an object with respect to a sum of a total number of alerts generated for the same object;
      generating a notice that the alert is a recurring alert when the recurrence frequency is greater than a recurrence-alert threshold;
      calculating an alert frequency as the number of times an alert has occurred for objects of the same object kind divided by the number of all alerts for objects of the same object kind; and
      generating a notice that the alert occurs with a high frequency for objects of the same object kind when the alert frequency is greater than an alert-frequency threshold.

5. The process of claim 1, further comprising:
   calculating an average alert duration for each object; and
   generating a notice that indicates problems one or more objects are not resolved for each object when the average alert duration is greater than an average-alert-duration threshold.

6. The process of claim 1, further comprising:
   calculating a problem-free lifetime for each object;
   generating a notice to take remedial action for the object when the problem-free lifetime for each object is less than a problem-free lifetime threshold;
   calculating an average-remediation time for each object; and
   generating a notice to take remedial action for the object when the average-remediation time for an object is less than a remediation-time threshold.

7. A system that prioritizes objects of a data center for remedial actions that correct performance problems with the objects, the system comprising:
   one or more processors;
   one or more data-storage devices; and
   machine-readable instructions stored in the one or more data-storage devices that when executed using the one or more processors controls the system to perform the operations comprising:
      calculating an object rank of each object of the data center over a period of time, wherein each object rank is calculated as a weighted function of relative frequencies of alerts that occur within the period of time for the object;
      calculating an object trend of each object of the data center, wherein each object trend is calculated as a weighted function of differences between a first relative frequency of alerts at a first time stamp and second relative frequency of alerts at a second time stamp for the object;
      determining an order of priority of the objects for applying remedial actions based on the object ranks and object trends; and
      executing the remedial actions to correct performance problems of the objects based on the order of priority.

8. The system of claim 7, wherein calculating the object rank of each object of the data center comprises:
   for each alert level, calculating the first relative frequency of alerts as a ratio of number of alerts for the object at the alert level and number of all possible alerts for objects of the same object kind over the period of time; and
   summing a product of the weight and the relative frequency to generate the object rank, wherein the weights increase with increasing alert level.

9. The system of claim 7, wherein calculating the object trend of each object of the data center comprises:
   calculating the first relative frequency of alerts as a ratio of number of alerts for the object at the alert level and number of all possible alerts for objects of the same object kind over a first period of time that ends at the first time stamp;
   calculating the second relative frequency of alerts as a ratio of number of alerts for the object at the alert level and number of all possible alerts for objects of the same object kind over a second period of time that ends at the second time stamp; and
   summing a product of the weight and the difference between the first and second relative frequencies, wherein the weights increase with increasing alert level.

10. The system of claim 7 further comprising:
for each alert,
calculating a recurrence frequency of an alert for an object with respect to a sum of a total number of alerts generated for the same object;
generating a notice that the alert is a recurring alert when the recurrence frequency is greater than a recurrence-alert threshold;
calculating an alert frequency as the number of times an alert has occurred for objects of the same object kind divided by the number of all alerts for objects of the same object kind; and
generating a notice that the alert occurs with a high frequency for objects of the same object kind when the alert frequency is greater than an alert-frequency threshold.

11. The system of claim 7, further comprising:
calculating an average alert duration for each object; and
generating a notice that indicates problems one or more objects are not resolved for each object when the average alert duration is greater than an average-alert-duration threshold.

12. The system of claim 7, further comprising:
calculating a problem-free lifetime for each object;
generating a notice to take remedial action for the object when the problem-free lifetime for each object is less than a problem-free lifetime threshold;
calculating an average-remediation time for each object; and
generating a notice to take remedial action for the object when the average-remediation time for an object is less than a remediation-time threshold.

13. A non-transitory computer-readable medium encoded with machine-readable instructions that implement a method carried out by one or more processors of a computer system to prioritize objects of a data center for remedial actions that correct performance problems with the objects by performing the operations comprising:
calculating an object rank of each object of the data center over a period of time, wherein each object rank is calculated as a weighted function of relative frequencies of alerts that occur within the period of time for the object;
calculating an object trend of each object of the data center, wherein each object trend is calculated as a weighted function of differences between a first relative frequency of alerts at a first time stamp and second relative frequency of alerts at a second time stamp for the object;
determining an order of priority of the objects for applying remedial actions based on the object ranks and object trends; and
executing the remedial actions to correct performance problems of the objects based on the order of priority.

14. The medium of claim 13, wherein calculating the object rank of each object of the data center comprises:
for each alert level, calculating the first relative frequency of alerts as a ratio of number of alerts for the object at the alert level and number of all possible alerts for objects of the same object kind over the period of time; and
summing a product of the weight and the relative frequency to generate the object rank, wherein the weights increase with increasing alert level.

15. The medium of claim 13, wherein calculating the object trend of each object of the data center comprises:
calculating the first relative frequency of alerts as a ratio of number of alerts for the object at the alert level and number of all possible alerts for objects of the same object kind over a first period of time that ends at the first time stamp;
calculating the second relative frequency of alerts as a ratio of number of alerts for the object at the alert level and number of all possible alerts for objects of the same object kind over a second period of time that ends at the second time stamp; and
summing a product of the weight and the difference between the first and second relative frequencies, wherein the weights increase with increasing alert level.

16. The medium of claim 13 further comprising:
for each alert,
calculating a recurrence frequency of an alert for an object with respect to a sum of a total number of alerts generated for the same object;
generating a notice that the alert is a recurring alert when the recurrence frequency is greater than a recurrence-alert threshold;
calculating an alert frequency as the number of times an alert has occurred for objects of the same object kind divided by the number of all alerts for objects of the same object kind; and
generating a notice that the alert occurs with a high frequency for objects of the same object kind when the alert frequency is greater than an alert-frequency threshold.

17. The medium of claim 13, further comprising:
calculating an average alert duration for each object; and
generating a notice that indicates problems one or more objects are not resolved for each object when the average alert duration is greater than an average-alert-duration threshold.

18. The medium of claim 13, further comprising:
calculating a problem-free lifetime for each object;
generating a notice to take remedial action for the object when the problem-free lifetime for each object is less than a problem-free lifetime threshold;
calculating an average-remediation time for each object; and
generating a notice to take remedial action for the object when the average-remediation time for an object is less than a remediation-time threshold.

* * * * *